US010171760B2

(12) United States Patent
Otaka

(10) Patent No.: US 10,171,760 B2
(45) Date of Patent: Jan. 1, 2019

(54) SOLID-STATE IMAGING DEVICE, METHOD FOR DRIVING SOLID-STATE IMAGING DEVICE, AND ELECTRONIC APPARATUS USING AN AMPLIFIER AND SIGNAL LINES FOR LOW AND HIGH GAIN

(71) Applicant: Brillnics Inc., Grand Cayman (KY)

(72) Inventor: Toshinori Otaka, Tokyo (JP)

(73) Assignee: BRILLNICS INC., Grand Cayman (KY)

( * ) Notice: Subject to any disclaimer, the term of this patent is extended or adjusted under 35 U.S.C. 154(b) by 0 days.

(21) Appl. No.: 15/678,356

(22) Filed: Aug. 16, 2017

(65) Prior Publication Data
US 2018/0054576 A1 Feb. 22, 2018

(30) Foreign Application Priority Data
Aug. 17, 2016 (JP) ................. 2016-160003

(51) Int. Cl.
H04N 5/355 (2011.01)
H04N 5/3745 (2011.01)
H04N 5/378 (2011.01)

(52) U.S. Cl.
CPC ......... *H04N 5/3559* (2013.01); *H04N 5/3745* (2013.01); *H04N 5/378* (2013.01)

(58) Field of Classification Search
CPC .... H04N 5/3559; H04N 5/3745; H04N 5/378; H04N 5/243
See application file for complete search history.

(56) References Cited

U.S. PATENT DOCUMENTS

| 6,697,111 | B1 | 2/2004 | Kozlowski et al. |
| 10,070,082 | B2 * | 9/2018 | Tsukuda ................. H04N 5/359 |
| 2005/0040485 | A1 | 2/2005 | Kawahito |
| 2005/0199813 | A1 | 9/2005 | Van Bogget |
| 2008/0266434 | A1 | 10/2008 | Sugawa et al. |

(Continued)

FOREIGN PATENT DOCUMENTS

| JP | 2002-501718 A | 1/2002 |
| JP | 2005-65074 A | 3/2005 |

(Continued)

*Primary Examiner* — Nicholas G Giles
(74) *Attorney, Agent, or Firm* — Westerman, Hattori, Daniels & Adrian, LLP

(57) ABSTRACT

A solid-state imaging device where when the charge from a photodiode PD11 is small, all of the charge is transferred to the feedback capacitor to obtain an output voltage amplified with a high gain due to a mirror effect created by a CTIA circuit including an amplifier arranged in a readout circuit and a feedback capacitor, while when the CTIA circuit is saturated, due to automatic reduction of the mirror effect, the remaining excessive charge is moved to a floating diffusion FD11 having a larger capacitance to obtain an output voltage amplified with a low gain and where the obtained voltage is simultaneously output from the pixel and taken into a column sampling circuit. Due to this, a low-luminance signal can be read out with a high gain, a high-luminance signal can be read out with a low gain suppressing saturation, and in addition, signals of a high gain and low gain can be obtained by two reading operations. Further, it becomes possible to improve the lowest object illuminance performance.

20 Claims, 22 Drawing Sheets

(56) References Cited

U.S. PATENT DOCUMENTS

2012/0188427 A1* 7/2012 Solhusvik ............ H04N 5/3559
348/300
2013/0099095 A1* 4/2013 Parks ................... H04N 5/3559
250/208.1

FOREIGN PATENT DOCUMENTS

JP 2005-328493 A 11/2005
JP 2006-505975 A 2/2006

* cited by examiner

PRIOR ART

PRIOR ART

PRIOR ART

FIG. 13A (@t1, FD RESET)
FIG. 13B (@t2, IMMEDIATELY AFTER RELEASE OF FD RESET)
FIG. 13C (@t4, TRANSFER PD SIGNAL)

SOLID-STATE IMAGING DEVICE, METHOD FOR DRIVING SOLID-STATE IMAGING DEVICE, AND ELECTRONIC APPARATUS USING AN AMPLIFIER AND SIGNAL LINES FOR LOW AND HIGH GAIN

CROSS-REFERENCE TO RELATED APPLICATION

The present invention contains subject matter related to Japanese Patent Application JP2016-160003 filed in the Japan Patent Office on Aug. 17, 2016, the entire contents of which being incorporated herein by reference.

TECHNICAL FIELD

The present invention relates to a solid-state imaging device, a method for driving a solid-state imaging device, and an electronic apparatus.

BACKGROUND ART

As a solid-state imaging device (image sensor) using a photoelectric conversion element which detects light and generates an electric charge, a CMOS (complementary metal oxide semiconductor) image sensor has been put into practical use. A CMOS image sensor has been widely applied as part of various types of electronic apparatuses such as digital cameras, video cameras, monitoring cameras, medical endoscopes, personal computers (PC), and mobile phones and other portable terminals (mobile devices).

A CMOS image sensor has a floating diffusion (FD) amplifier having, for each pixel, a photodiode (photoelectric conversion element) and floating diffusion layer. For readout, the mainstream type is the column parallel output type that performs selects a certain row in a pixel array and simultaneously reads the pixels out to a column output direction.

In this regard, as the configuration of the pixel, as representative types, a first pixel configuration shown in FIG. 1, a second pixel configuration shown in FIG. 2, and a third pixel configuration shown in FIG. 3 can be illustrated.

FIG. 1 is a diagram showing an example of the first pixel configuration of a CMOS image sensor. FIG. 1 illustrates a 4-transistor (4Tr) APS pixel (for example, see PLT 1).

This 4TrAPS pixel 1 has one transfer transistor Tr1 as a transfer element, reset transistor Tr2 as a reset element, source-follower transistor Tr3 as a source-follower element, and selection transistor Tr4 as a selection element with respect to one photodiode (photoelectric conversion element) PD1.

The transfer transistor Tr1 is selected and becomes a conductive state for a predetermined transfer period and transfers a charge (electrons) which is photoelectrically converted and accumulated in the photodiode PD1 to the floating diffusion FD. The reset transistor Tr2 is selected and becomes a conductive state for a predetermined reset period and resets the floating diffusion FD to the potential of the power supply line. The selection transistor Tr4 is selected and becomes a conductive state at the time of readout scanning. Due to this, the source-follower transistor Tr3 outputs a readout signal of column output obtained by converting the charge in the floating diffusion FD to a voltage signal in accordance with the charge quantity (potential) to a vertical signal line LSGN1.

For example, in the readout scan period, after the floating diffusion FD is reset to the potential of the power supply line in the reset period, the charge in the floating diffusion FD is converted to a voltage signal in accordance with the charge quantity (potential) by the source-follower transistor Tr3 and is output as a readout reset voltage Vrst to the vertical signal line LSGN1. Then, in a predetermined transfer period, the charge (electrons) which is photoelectrically converted and accumulated in the photodiode PD1 is transferred to the floating diffusion FD. Then, by the source-follower transistor Tr3 and a capacitance Cfd1 parasitic on the floating diffusion FD, the charge in the floating diffusion FD is converted to the voltage signal in accordance with the charge quantity (potential) and output as a readout signal voltage Vsig to the vertical signal line LSGN1. The output signal of the pixel is processed as a differential signal (Vrst-Vsig).

In general, increased sensitivity of the pixel 1 in FIG. 1 can be realized by raising a conversion gain. In the pixel 1 in FIG. 1, a certain extent of increased sensitivity is possible by lowering the capacitance Cfd1 of the floating diffusion FD.

FIG. 2 is a diagram showing an example of the second pixel configuration of the CMOS image sensor. FIG. 2 shows an example of a capacitive trans-impedance amplifier (CTIA) pixel (for example see PLT 2 and PLT 3).

This CTIA pixel 2 has one reset transistor Tr11, driver transistor Tr12, auxiliary driver transistor Tr13, and feedback capacitor C1 with respect to one photodiode (photoelectric conversion element) PD2. The pixel 2 is connected through a selection transistor Tr14 to a vertical signal line LSGN2, while the vertical signal line LSGN2 is connected through P-channel transistors Tr15 and Tr16 to the power supply VDD.

In this pixel 2, increased sensitivity can be realized by making the capacitance Cfb1 of the feedback capacitor C1 smaller than the capacitance Cfd1 of the floating diffusion FD (sometimes simply referred to as an "FD") of the pixel 1 in FIG. 1, so a low luminance subject can be brightly captured.

FIG. 3 is a diagram showing an example of the third pixel configuration of the CMOS image sensor. FIG. 3 shows an example of a pixel provided with a lateral overflow integration capacitor (LOFIC) C2 (capacitance Clofic) (for example, see PLT 4).

The pixel 3 in this FIG. 3 is comprised of the configuration of the pixel 1 in FIG. 1 to which an integration capacitor C2 connected to a switch transistor Tr5 and node LO is added.

In the pixel 3 in FIG. 3, an oversaturated charge overflowing from the photodiode PD1 in the same exposure time is not disposed of, but is integrated (accumulated) in the storage capacitor C2 having the capacitance Clofic.

The pixel 3 in FIG. 3 can have two types of conversion gain of the conversion gain due to the capacitance Cfd1 of the floating diffusion FD (high gain side:proportional to 1/Cfd1) and the conversion gain due to the capacitance Cfd1 of the floating diffusion FD+LOFIC capacitance Clofic of the integration capacitor C2 (low gain side: proportional to 1/(Cfd1+Clofic)).

CITATION LIST

Patent Literature
 PLT 1: Japanese Patent Publication No. 2005-65074A, FIG. 2
 PLT 2: Japanese Patent Publication No. 2006-505975A
 PLT 3: Japanese Patent Publication No. 2002-501718A
 PLT 4: Japanese Patent Publication No. 2005-328493A

SUMMARY OF INVENTION

Technical Problem

As explained above, increased sensitivity of the pixel in FIG. 1 can be realized by raising the conversion gain. In the pixel 1 in FIG. 1, a certain extent of increased sensitivity is possible by lowering the capacitance Cfd1 of the floating diffusion FD. However, if the gain is too high, the effective number of saturated electrons is decreased, therefore detail of a high luminance subject is lost. Contrary to this, when the capacitance Cfd1 of the floating diffusion FD is raised, detail of a high luminance subject is obtained, but detail of a low luminance subject is lost. Further, the reduction of potential difference between the photodiode PD1 and the floating diffusion FD becomes conspicuous, therefore deterioration of the image quality of a moving picture due to occurrence of a time lag is caused. Further, the higher the conversion gain, the larger the voltage fluctuation due to clock feedthrough etc. at the time of reset of a pixel and the narrower the voltage amplitude range. Therefore, the effective number of saturated electrons is further lowered. Accordingly, generally, it may be difficult to simultaneously realize increased sensitivity and higher dynamic range with the use of the conventional pixel configurations.

As explained above, in the pixel 2 in FIG. 2, increased sensitivity can be realized by making the capacitance Cfb1 of the feedback capacitor C1 smaller than the capacitance Cfd1 of the floating diffusion FD in the pixel 1 in FIG. 1, so a low-luminance subject can be brightly captured. However, the higher the sensitivity, the lower the number of saturated electrons. Therefore, more detail of a high-luminance subject becomes lost. Here, the case was illustrated where no transfer transistor (for example Tr1 in FIG. 1) was used between the photodiode PD2 and the floating diffusion FD, but the same is true also for the case using a transfer transistor.

As opposed to this, the pixel 3 in FIG. 3, as explained above, can have two types of conversion gain of the conversion gain due to the capacitance Cfd1 of the floating diffusion FD (high gain side: proportional to 1/Cfd1) and the conversion gain due to the capacitance Cfd1 of the floating diffusion FD+LOFIC capacitance Clofic of the integration capacitor C2 (low gain side: proportional to 1/(Cfd1+Clofic)).

Note, in the pixel 3 in FIG. 3, four readout periods become necessary, therefore in an image sensor having multiple pixels, it becomes difficult to raise the frame rate. On the high gain side, all of the parasitic capacitance on the FD node becomes a conversion gain factor, therefore only the same degree of increased sensitivity can be achieved as that by the 4TrAPS type in FIG. 1. For a signal on the low gain side, true correlated double sampling cannot be carried out, therefore reset noise, FD dark current and dark current shot noise, and dark current and dark current shot noise in the node (LO) to which the capacitance is connected cannot be removed. Therefore, there is the problem of deterioration of precision when combining a high gain image and a low gain image. Further, the effective number of saturated electrons at the time of high gain is decreased due to clock feedthrough etc. at the time of pixel reset, therefore deterioration of actual performance such as the lowest object illuminance guideline of SNR10 and so on are a concern.

The present invention provides a solid-state imaging device, a method for driving the solid-state imaging device, and an electronic apparatus capable of reading a low-luminance signal with a high gain, capable of reading a high-luminance signal with a low gain suppressing saturation, and in addition capable of obtaining signals of a high gain and low gain by two reading operations and capable of improving lowest object illuminance performance.

Solution to Problem

A solid-state imaging device of a first aspect of the present invention has a pixel portion in which pixels are arranged, a readout circuit including an amplifier capable of amplifying a pixel readout voltage read out from the pixels, a first signal line to which a readout voltage of a low gain is output, and a second signal line to which the output side of the amplifier is connected and a readout voltage of a high gain is output, wherein a pixel includes a photoelectric conversion element which accumulates a charge generated by photoelectric conversion in an accumulation period, a transfer element capable of transferring a charge accumulated in the photoelectric conversion element in a transfer period, a floating diffusion to which a charge accumulated in the photoelectric conversion element is transferred through the transfer element, a source-follower element which converts the charge of the floating diffusion to a voltage signal in accordance with the charge quantity, a reset element which resets the floating diffusion to the potential of the second signal line or a predetermined potential in a reset period, and a feedback capacitor having one electrode connected to the floating diffusion and having another electrode connected to the second signal line, wherein the first signal line connected to an output line of the voltage signal by the source-follower element and connected to the input side of the amplifier.

A second aspect of the present invention is a method for driving a solid-state imaging device having a pixel portion in which pixels are arranged, a readout circuit including an amplifier capable of amplifying a pixel readout voltage read out from the pixels, a first signal line to which a readout voltage of a low gain is output, and a second signal line to which the output side of the amplifier is connected and a readout voltage of a high gain is output, wherein a pixel includes a photoelectric conversion element which accumulates a charge generated by photoelectric conversion in an accumulation period, a transfer element capable of transferring a charge accumulated in the photoelectric conversion element in a transfer period, a floating diffusion to which a charge accumulated in the photoelectric conversion element is transferred through the transfer element, a source-follower element which converts the charge of the floating diffusion to a voltage signal in accordance with the charge quantity, a reset element which resets the floating diffusion to the potential of the second signal line or a predetermined potential in a reset period, and a feedback capacitor having one electrode connected to the floating diffusion and having another electrode connected to the second signal line, wherein the first signal line connected to an output line of the voltage signal by the source-follower element and connected to the input side of the amplifier, comprising the steps of, when the charge from the photoelectric conversion element is small, transferring all of the charge to the feedback capacitor by a mirror effect created by a capacitive transimpedance amplifier (CTIA) circuit including the amplifier and a feedback capacitor and thereby obtaining an output voltage amplified with a high gain and moving the remaining excessive charge to the floating diffusion having a larger capacity by automatic reduction of the mirror effect when the CTIA circuit is saturated and thereby obtaining an output voltage amplified with a low gain.

An electronic apparatus of a third aspect of the present invention comprises a solid-state imaging device and an optical system for forming a subject image in the solid-state imaging device, wherein the solid-state imaging device has a pixel portion in which pixels are arranged, a readout circuit including an amplifier capable of amplifying a pixel readout voltage read out from the pixels, a first signal line to which a readout voltage of a low gain is output, and a second signal line to which the output side of the amplifier is connected and a readout voltage of a high gain is output, wherein a pixel includes a photoelectric conversion element which accumulates a charge generated by photoelectric conversion in an accumulation period, a transfer element capable of transferring a charge accumulated in the photoelectric conversion element in a transfer period, a floating diffusion to which a charge accumulated in the photoelectric conversion element is transferred through the transfer element, a source-follower element which converts the charge of the floating diffusion to a voltage signal in accordance with the charge quantity, a reset element which resets the floating diffusion to the potential of the second signal line or a predetermined potential in a reset period, and a feedback capacitor having one electrode connected to the floating diffusion and having another electrode connected to the second signal line, wherein the first signal line connected to an output line of the voltage signal by the source-follower element and connected to the input side of the amplifier.

Advantageous Effects of Invention

According to the present invention, a low-luminance signal can be read out with a high gain, a high-luminance signal can be read out with a low gain suppressing a saturation, signals of a high gain and a low gain can be obtained by two reading operations, and further the lowest object illuminance performance can be improved.

DESCRIPTION OF EMBODIMENTS

Below, embodiments of the present invention will be explained with reference to the drawings.

First Embodiment

Figure 1:
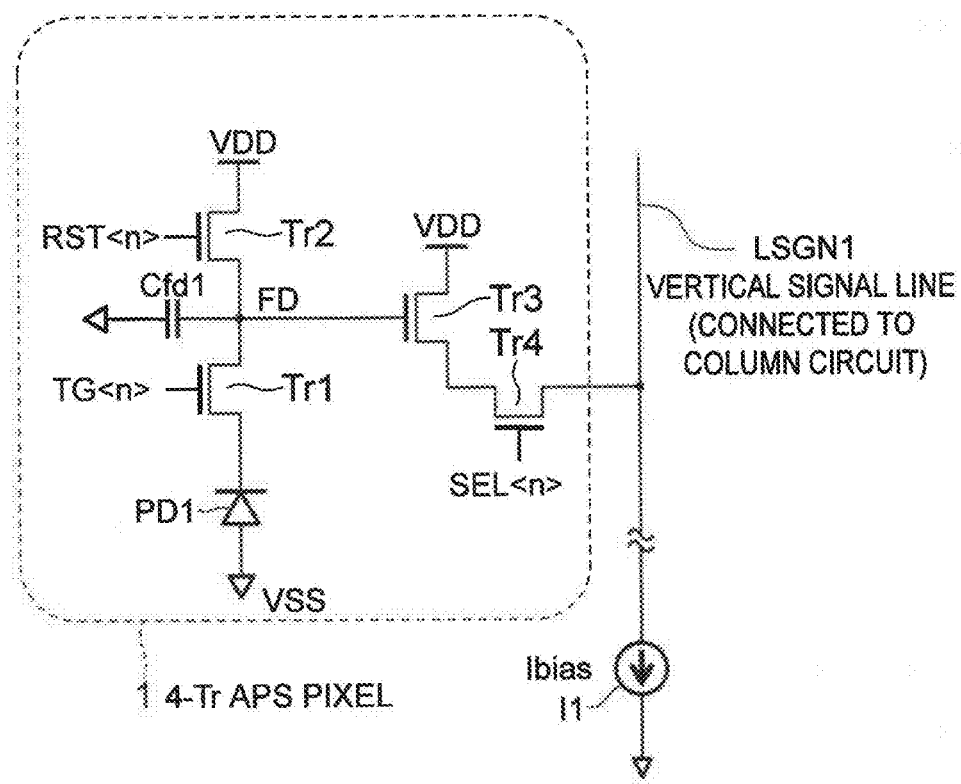
FIG. 1 is a diagram showing an example of a first pixel configuration of a CMOS image sensor.
Figure 2:
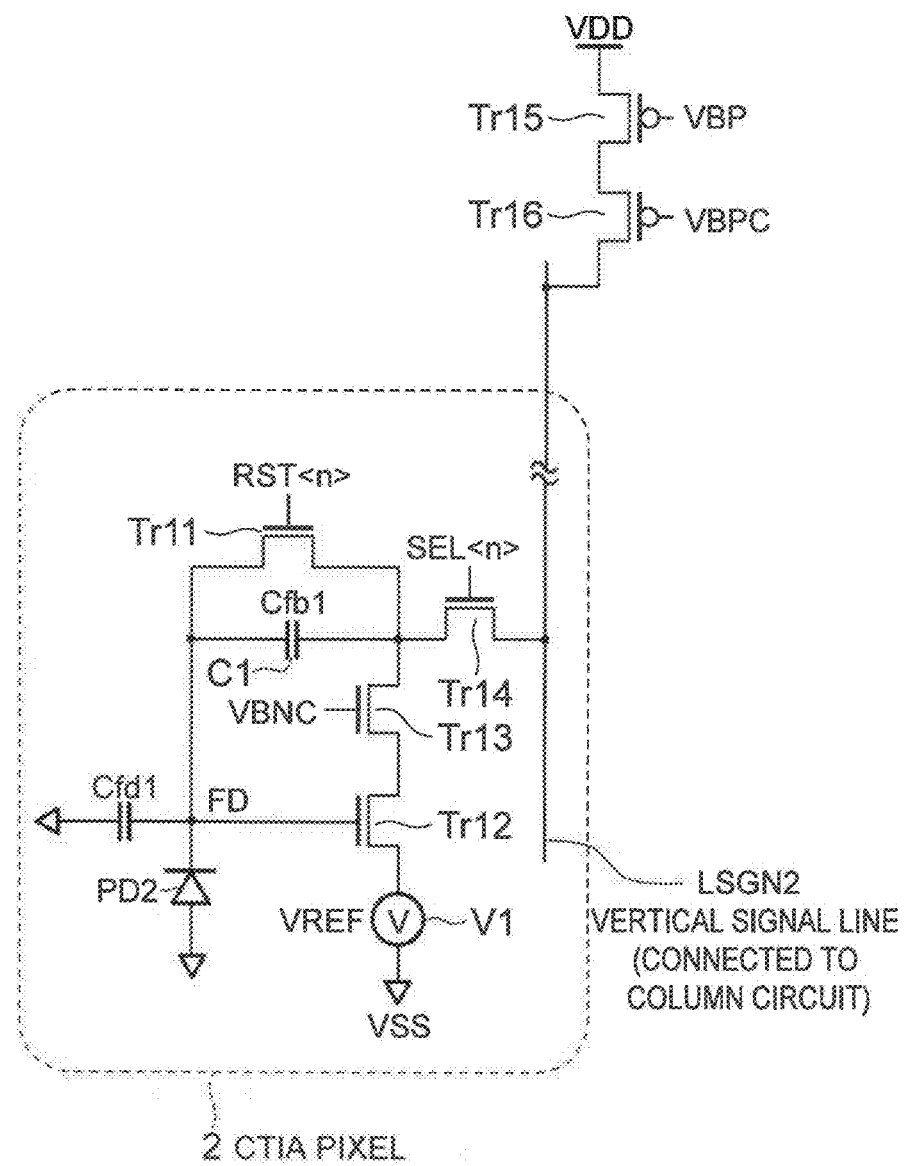
FIG. 2 is a diagram showing an example of a second pixel configuration of a CMOS image sensor.
Figure 3:
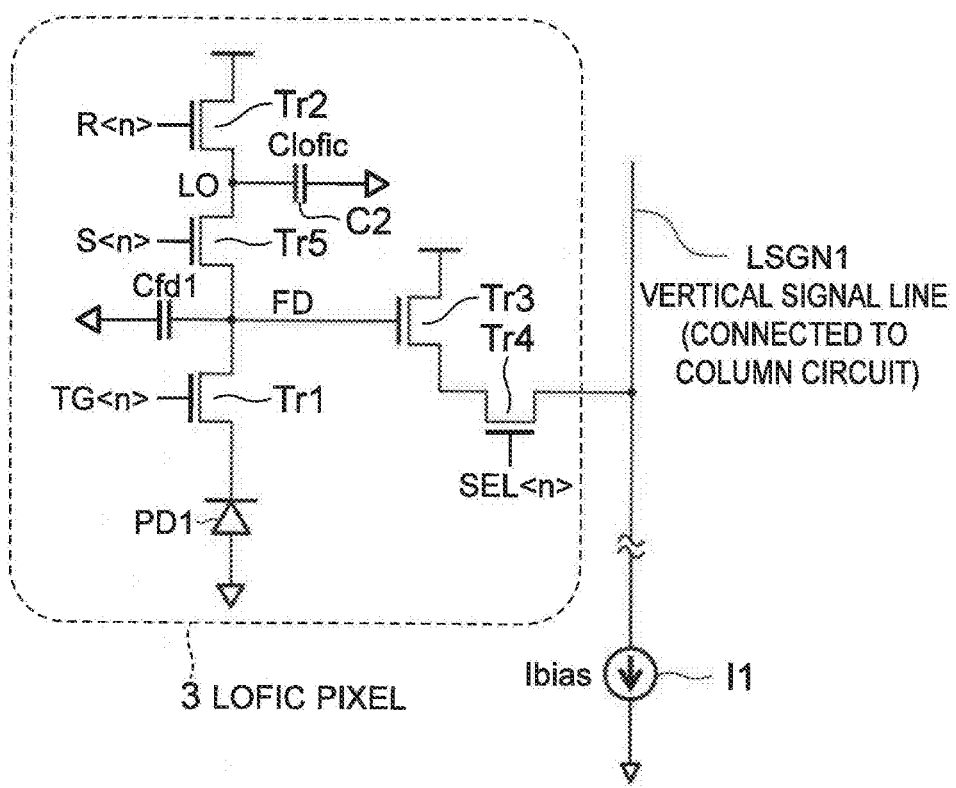
FIG. 3 is a diagram showing an example of a third pixel configuration of a CMOS image sensor.
Figure 4:
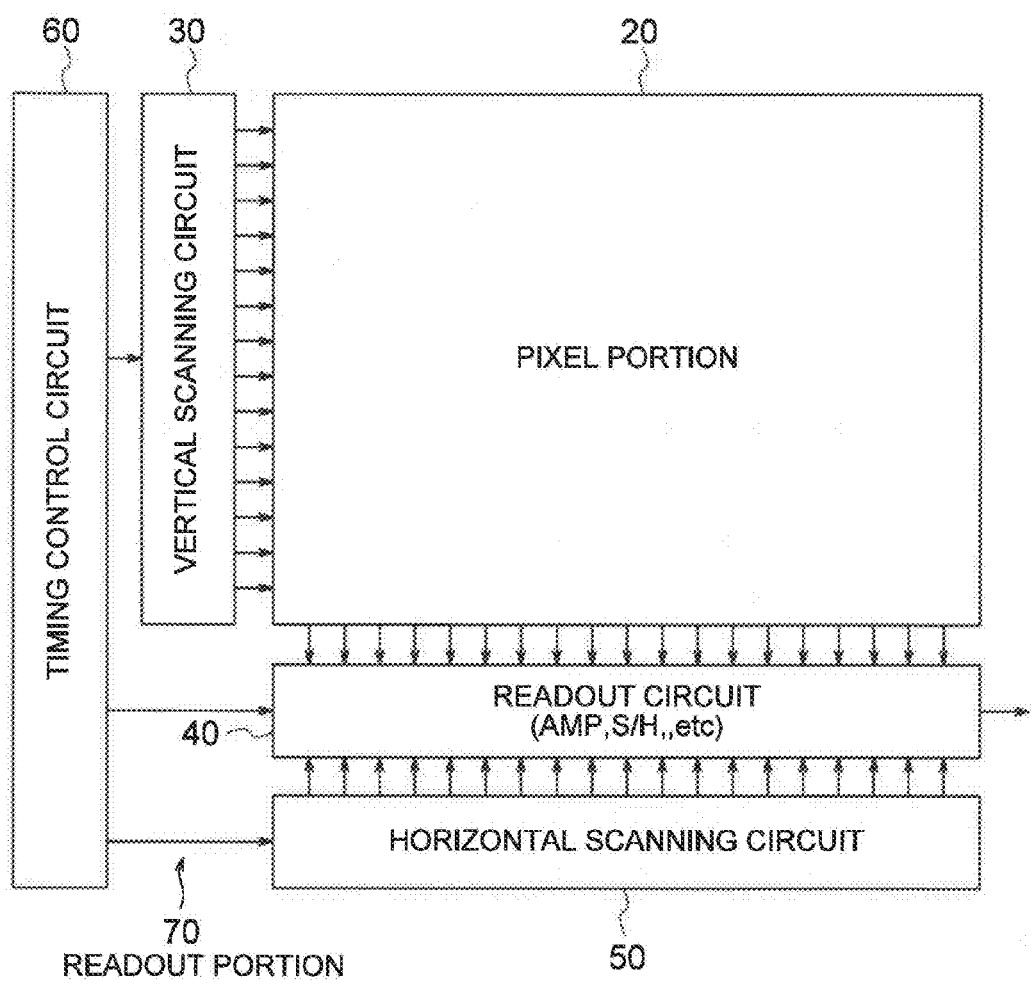
FIG. 4 is a block diagram showing an example of the configuration of a solid-state imaging device according to a first embodiment of the present invention.

FIG. 4 is a block diagram showing an example of the configuration of a solid-state imaging device according to a first embodiment of the present invention. In the present embodiment, a solid-state imaging device 10 is for example configured by a CMOS image sensor.

This solid-state imaging device 10, as shown in FIG. 4, has a pixel portion 20 as an imaging part, a vertical scanning circuit (row scanning circuit) 30, a readout circuit (column readout circuit) 40, a horizontal scanning circuit (column scanning circuit) 50, and a timing control circuit 60 as principal components. Among these components, for example, the vertical scanning circuit 30, readout circuit 40, horizontal scanning circuit 50, and timing control circuit 60 configure a readout portion 70 of pixel signals.

In the first embodiment, when the charge from the photodiode (photoelectric conversion element) is small, the solid-state imaging device 10, as will be explained in detail later, transfers all of the charge to a feedback capacitor by a mirror effect created by a capacitive trans-impedance amplifier (CTIA) circuit including an amplifier arranged in the column readout circuit 40 and the feedback capacitor to obtain an output voltage amplified with a high gain. When the CTIA circuit is saturated, the device moves the remaining excessive charge to a floating diffusion FD having a larger capacity since the mirror effect is automatically reduced and thereby obtains an output voltage amplified with a low gain.

In this way, the solid-state imaging device 10 in the first embodiment is configured so that it can read out the signal voltage amplified with two types of a high gain and a low gain simultaneously in parallel, can sample the signal voltages of a high gain and low gain simultaneously in parallel, can read out a low-luminance signal with a high gain and can read out a high-luminance signal with a low gain suppressing saturation, can obtain signals of a high gain and low gain by two reading operations, and can improve the lowest object illuminance performance.

Below, an outline of the configurations and functions of the different portions in the solid-state imaging device 10, particularly the configurations and functions of the pixel portion 20 and column readout circuit 40, readout processing related to them, the stacked structures of the pixel portion 20 and reading part 70, and so on will be explained in detail.

Configurations of Pixel Portion 20 and Pixel PXL In the pixel portion 20, a plurality of pixels each including a photodiode (photoelectric conversion element) and inside pixel amplifier are arranged in a two-dimensional matrix state comprised of N number of rows and M number of columns.

Figure 5:
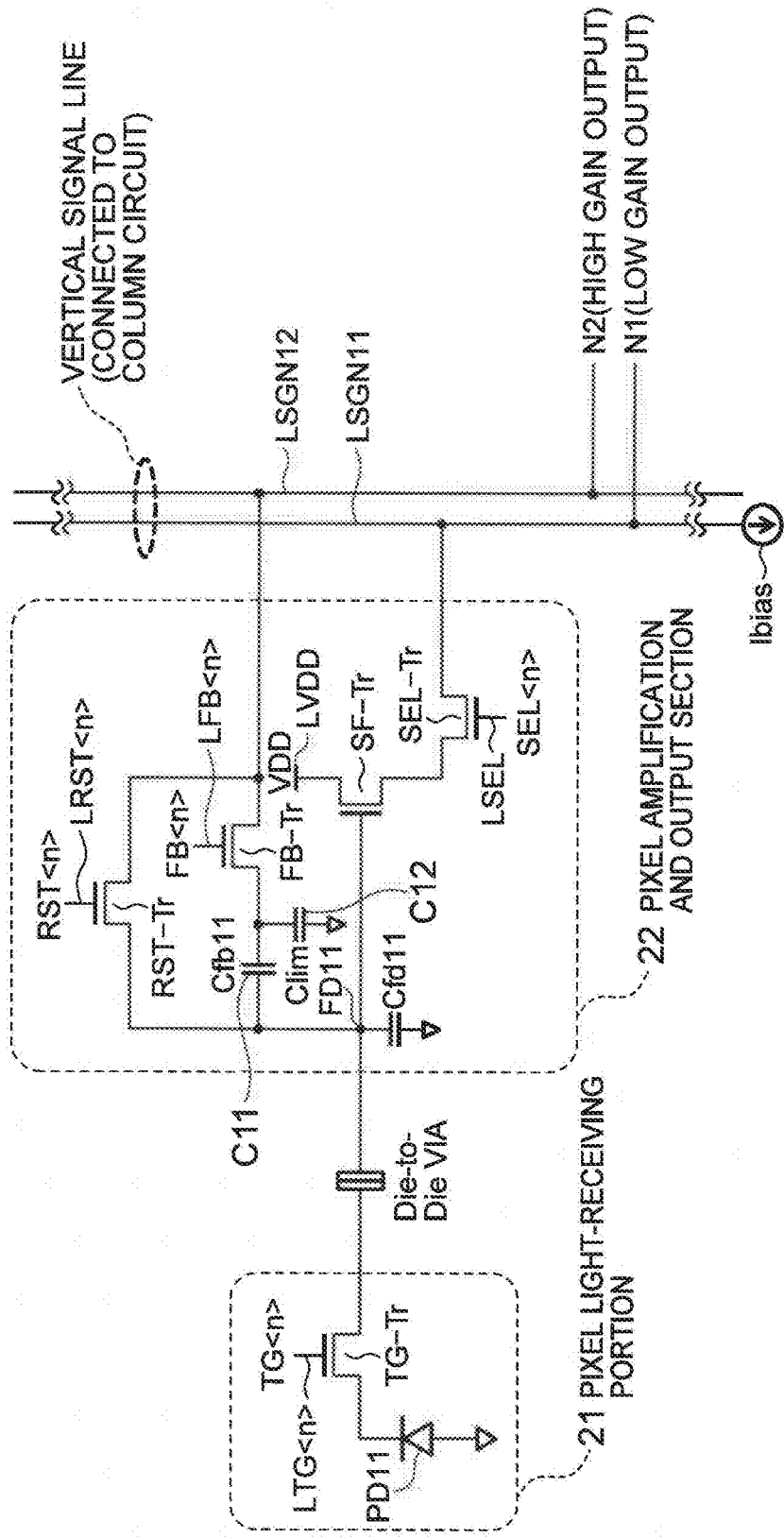
FIG. 5 is a circuit diagram showing an example of a pixel according to the first embodiment.

FIG. 5 is a circuit diagram showing an example of a pixel according to the present embodiment.

This pixel PXL for example has a photodiode (PD) 11 as a photoelectric conversion element. It has, with respect to this photodiode PD11, one transfer transistor TG-Tr as a transfer element, reset transistor RST-Tr as a reset element, source-follower transistor SF-Tr as a source-follower element, selection transistor SEL-Tr as a selection element (selection switch), feedback transistor FB-Tr as a feedback element (feedback switch), floating diffusion FD11, feedback capacitor C11, and band limiting capacitor C12. In this way, the pixel PXL according to the first embodiment includes five transistors (5Tr) of the transfer transistor TG-Tr, reset transistor RST-Tr, source-follower transistor SF-Tr, selection transistor SEL-Tr, and feedback transistor FB-Tr.

In the first embodiment, among these components of the pixel PXL, a pixel light-receiving portion 21 is formed by the photodiode PD11 and transfer transistor TG-Tr, while a pixel amplification and output section 22 is formed by the reset transistor RST-Tr, source-follower transistor SF-Tr, selection transistor SEL-Tr, feedback transistor FB-Tr, floating diffusion FD11, feedback capacitor C11, and band limiting capacitor C12.

The pixel amplification and output section 22 according to the first embodiment is connected to a first vertical signal line LSGN11 and second vertical signal line LSGN12. The pixel amplification and output section 22 outputs a readout voltage (signal voltage) N1 (VRST1, VSIG1) of a low gain to the first vertical signal line LSGN11. The pixel amplification and output section 22 outputs a readout voltage (signal voltage) N2 (VRST2, VSIG2) of a high gain to the second vertical signal line LSGN12. The pixel amplification and output section 22 has the function of outputting the readout voltage N1 (VRST1, VSIG1) of a low gain to the first vertical signal line LSGN11 and outputting the readout voltage N2 (VRST2, VSIG2) of a high gain to the second vertical signal line LSGN12 simultaneously in parallel.

In the first embodiment, the first vertical signal line LSGN11 is driven by a constant current source Ibias, while the second vertical signal line LSGN12 is driven by a column amplifier of one of the components of the column readout circuit 40.

The pixel amplification and output section 22 according to the first embodiment has a configuration combining the feedback portion of the CTIA (capacitive trans-impedance amplifier) circuit and the source-follower amplifier.

The photodiode PD11 generates and accumulates (stores) a signal charge (here, electrons) in an amount in accordance with an incident light quantity. Below, an explanation will be given of a case where a signal charge is comprised of electrons and each transistor is an n-type transistor. However, a signal charge may be comprised of a positive hole or each transistor may be a p-type transistor as well. Further, the present embodiment is effective also in a case where each transistor is shared among a plurality of photodiodes or a case where a four-transistor (4Tr) pixel not having a selection transistor is employed.

The transfer transistor TG-Tr in the pixel light-receiving portion 21 is connected between the photodiode PD11 and the floating diffusion FD11 and is controlled by a control signal TG<n> applied to the gate through a control line LTG<n>. The transfer transistor TG-Tr is selected and becomes a conductive state in a transfer period in which the control signal TG<n> is at a high level H and transfers the charge (electrons) which is photoelectrically converted and accumulated in the photodiode PD11 to the floating diffusion FD11 in the pixel amplification and output section 22.

The reset transistor RST-Tr is connected between the second vertical signal line LSGN12 and the floating diffusion FD11 and is controlled by a control signal RST<n> applied through a control line LRST<n>. The reset transistor RST-Tr is selected and becomes a conductive state and resets the floating diffusion FD11 to the potential of the second vertical signal line LSGN12 in a reset period in which the control signal RST<n> is at an H level. Note that, the potential VREF of the second vertical signal line LSGN12 and so on will be explained in detail later.

The source-follower transistor SF-Tr and the selection transistor SEL-Tr are connected in series between a power supply line LVDD and the first vertical signal line LSGN11. The gate of the source-follower transistor SF-Tr is connected to the floating diffusion FD11. The selection transistor SEL-Tr is controlled by a control signal SEL<n> applied to the gate through a control line LSEL<n>. The selection transistor SEL-Tr is selected and becomes a conductive state in a selection period in which the control signal SEL<n> is at an H level. Due to this, the source-follower transistor SF-Tr outputs the readout voltage N1 (VRST1, VSIG1) with a low gain of column output obtained by converting the charge in the floating diffusion FD11 to the voltage signal in accordance with the charge quantity (potential) to the first vertical signal line LSGN1.

The feedback capacitor C11 and the feedback transistor FB-Tr are connected in series between the floating diffusion FD11 and the second vertical signal line LSGN12. That is, between the floating diffusion FD11 and the second vertical signal line LSGN12, the feedback capacitor C11 and the feedback transistor FB-Tr are connected in parallel to the reset transistor RST-Tr. The feedback capacitor C11 has one electrode connected to the floating diffusion FD11 and has another electrode connected through the feedback transistor FB-Tr to the second vertical signal line LSGN12.

The feedback transistor FB-Tr is controlled according to a control signal FB<n> applied to the gate through a control line LFB<n>. The feedback transistor FB-Tr is selected and becomes a conductive state and electrically connects the feedback capacitor C11 to the second vertical signal line LSGN12 in a feedback period in which the control signal FB<n> is at an H level.

The feedback capacitor C11 is set in capacitance to Cfb11. The capacitance Cfb11 of the feedback capacitor C11 is set at a value smaller than the capacitance Cfd11 of the floating diffusion FD11. Further, by using an MOM (Metal-Oxide- Metal) capacitor, in the feedback capacitor C11, the manufacturing variation will be smaller than that in a conventional 4trAPS pixel, therefore a linear response characteristic with a small voltage dependency and high increased sensitivity can be realized.

Note that, between a connection point of the feedback capacitor C11 and the feedback transistor FB-Tr and the reference potential VSS (for example, ground), a band limiting capacitor C12 may be provided as well. By providing the band limiting capacitor C12, thermal noise of the feedback transistor FB-Tr can be lowered. The capacitance of the band limiting capacitor C12 is set at Clim. Note that, the band limiting capacitor C12 may be realized by an MOS capacitor having a large capacitance as well.

Note that, in order to realize low noise, the source-follower transistor SF-Tr may be a so-called "buried channel type" transistor as well. Further, the reset transistor RST-Tr, the selection transistor SEL-Tr, and the feedback transistor FB-Tr functioning as the switching elements may be transistors having low threshold values in order to reduce a gate/source voltage which is necessary for turning on as well.

In the pixel PXL explained above, when the charge from the photodiode PD11 is small, due to the mirror effect created by the CTIA circuit, the charge is all transferred to the feedback capacitor C11 having the capacitance Cfb11 and thus an output voltage N2 (VRST2, VSIG2) amplified with a high gain is obtained. On the other hand, when the CTIA circuit is saturated, the mirror effect is automatically reduced, therefore the remaining excessive charge moves to the floating diffusion FD11 having a larger capacitance Cfd11, and thus the output voltage N1 (VRST1, VSIG1) amplified with a low gain is obtained.

The characteristic feature of the present pixel PXL having such a function resides in that, compared with a conventional LOFIC pixel, switching the gain does not require pulse drive and is automatically carried out. Due to this, no factors of superimposition of channel charges due to driving transistors for gain switching or of clock feedthrough charge loss due to fluctuation of a threshold value of a substrate bias effect are generated in principle, therefore the number of charges from the photodiode PD11 can be accumulated. As a result, no discontinuous points are generated when combining high gain and low gain, therefore they can be connected with a high precision.

These operations are carried out simultaneously in parallel for one row's worth of pixels since for example the gates of the transfer transistors TG-Tr, reset transistors RST-Tr, selection transistors SEL-Tr, and feedback transistors FB-Tr are connected in units of rows.

In the pixel portion 20, the pixels PXL are arranged in N number of rows and in M number of columns, therefore the number of each of the control lines LSEL, LRST, LTG, and LFB is N, and there are 2 XM vertical signal lines LSGN11 and LSGN12. In FIG. 4, the control lines LSEL, LRST, LTG, and LFB are expressed as a single row scanning control line. In the same way, the vertical signal lines LSGN11 and LSGN12 are expressed as a single vertical signal line.

The vertical scanning circuit 30 drives pixels through the row scanning control line in a shutter row and reading row under the control of the timing control circuit 60. Further, the vertical scanning circuit 30 outputs a row selection signal of a row address for a read row for reading signals and for a shutter row for resetting the charges accumulated in the photodiodes PD according to address signals.

The column readout circuit 40 may be configured so that it includes a plurality of column signal processing circuits (not shown) arranged corresponding to the column outputs in the pixel portion 20 and so that column parallel processing is possible among the plurality of column signal processing circuits.

The column readout circuit 40 according to the first embodiment includes an amplifier (AMP) and sampling (S/H) circuit. Note that, the column readout circuit 40 can include a correlated double sampling (CDS) circuit or ADC (analog-to-digital converter: AD converter) etc.

In the column readout circuit 40 in the first embodiment, the first vertical signal line LSGN11 is driven by the constant current source Ibias, and the second vertical signal line LSGN12 is driven by the column amplifier forming part of the components of the column readout circuit 40. In the readout circuit 40 in the first embodiment, the readout voltage N2 (VRST2, VSIG2) of a high gain is sampled by a high gain sampling circuit, while the readout voltage N1 (VRST1, VSIG1) of a low gain is sampled by a low gain sampling circuit. In the column readout circuit 40, the signal voltages N1 and N2 of a high gain and low gain are sampled simultaneously in parallel.

Example of Configuration of Column Readout Circuit 40

Figure 6:
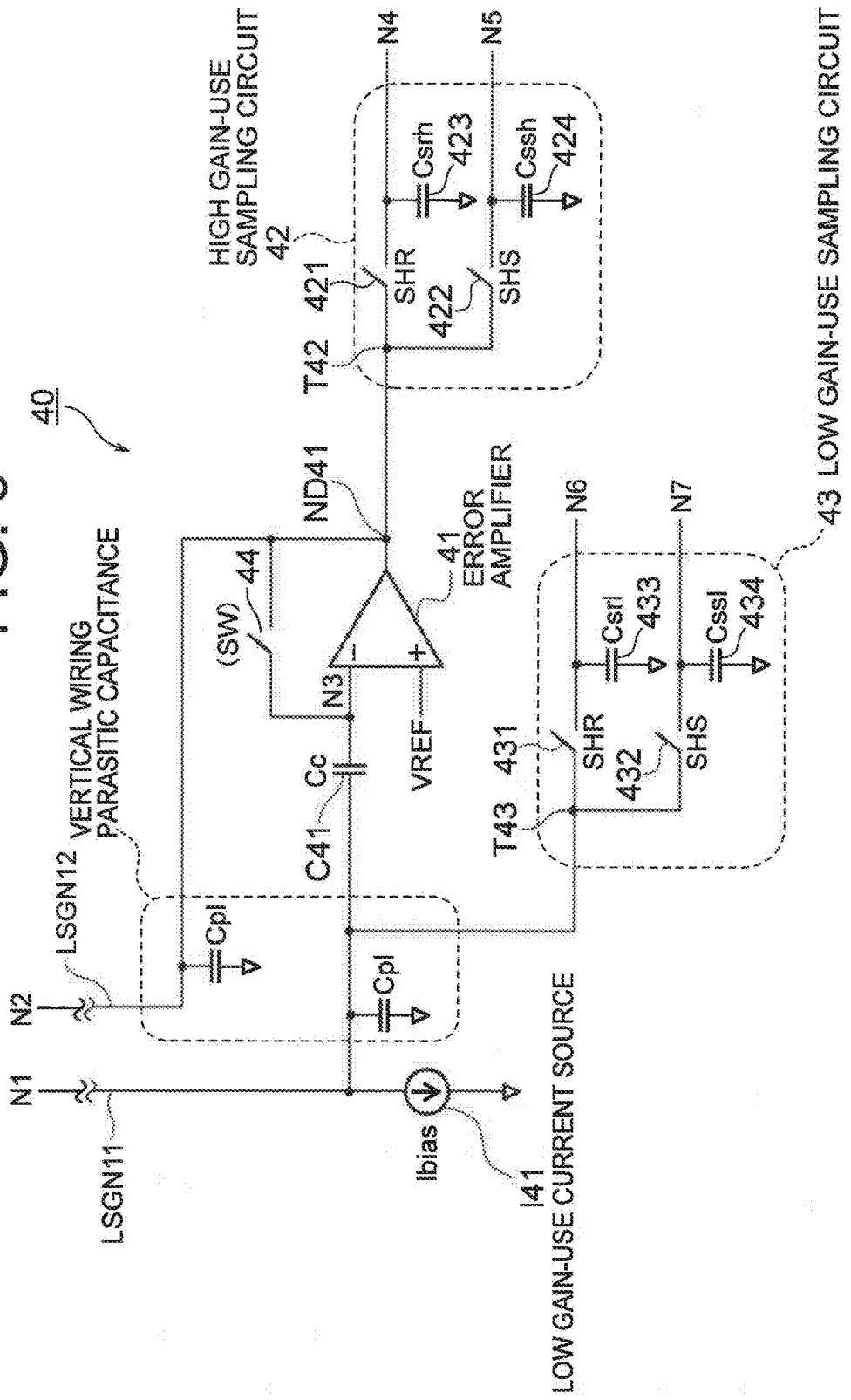
FIG. 6 is a circuit diagram showing an example of the configuration of a column readout circuit according to the first embodiment.

FIG. 6 is a circuit diagram showing an example of the configuration of the column readout circuit in the first embodiment.

The column readout circuit 40 in FIG. 6 includes, corresponding to each column, an error amplifier 41 suitable for a CTIA circuit, high gain-use sampling circuit 42, low gain-use sampling circuit 43, switch (SW) 44, low gain-use constant current source I41 (Ibias), and serial capacitor (input capacitor) C41 having a capacitance Cc.

Note that, the high gain-use sampling circuit 42 and low gain-use sampling circuit 43 are just one embodiment. The present invention is not limited to this embodiment.

The error amplifier 41 is connected at its output terminal to the second vertical signal line LSGN12 and is connected at a connection node ND41 thereof to the high gain-use sampling circuit 42. One input terminal (inverted input terminal (−) in the present example) of the error amplifier 41 is connected to the serial capacitor C41 and is connected through the serial capacitor C41 to the first vertical signal line LSGN11. The error amplifier 41 is configured so that the switch 44 is connected between one input terminal (−) and the output terminal and so that one input terminal (−) and the output terminal can be selectively switched to a connection state (short-circuiting state) and non-connection state (non-short-circuiting state). In the error amplifier 41, the other input terminal (non-inverted input terminal (+) in the present example) is connected to the supply line of the reference voltage VREF. The first embodiment is configured so that the reference voltage VREF can be dynamically switched.

In the high gain-use sampling circuit 42, a reset-use sampling switch 421 and a signal-use sampling switch 422 are connected in parallel with respect to the input terminal T42. The reset-use sampling switch 421 is controlled on/off by a signal SHR and is connected to a reset-use hold capacitor 423 at its output side. The signal-use sampling switch 422 is controlled on/off by a signal SHS and is connected to a signal-use hold capacitor 424 at its output side.

In the low gain-use sampling circuit 43, a reset-use sampling switch 431 and a signal-use sampling switch 432 are connected in parallel with respect to the input terminal T43. The reset-use sampling switch 431 is controlled on/off by the signal SHR and is connected to a reset-use hold capacitor 433 at its output side. The signal-use sampling switch 432 is controlled on/off by the signal SHS and is connected to a signal-use hold capacitor 434 at its output side.

In the column readout circuit 40 in the first embodiment, sampling can be carried out simultaneously in parallel by the high gain-use sampling circuit 42 and low gain-use sampling circuit 43 by using the two vertical signal lines LSGN11 and LSGN12 connected to the pixels PXL. As a result, a reading operation is completed by two sampling operations, therefore a high frame rate can be realized. By utilizing a column circuit capable of being given a broader area than that of the pixel, a high DC gain, high speed, low noise error amplifier can be realized. Further, the reference voltage VREF can be switched to change the range settings of the high gain and low gain.

The error amplifier 41 necessary for the CTIA circuit can be mounted in a column circuit capable of using a broader area, therefore both high DC gain and high bandwidth can be achieved, so higher precision and higher speed reading than a conventional CTIA pixel can be realized. Further, by decoupling the source-follower output of the pixel and error amplifier input in terms of DC by the serial capacitor C41 (Cc) provided in the input stage (front stage) of the error amplifier 41, even if the error amplifier 41 is rendered a unity gain buffer state (the switch 44 is in ON state), the amplifier using the source-follower transistor SF-Tr of the pixel PXL can be always operated in a saturated state in spite of fluctuation of the threshold value. By releasing the pixel reset state while keeping the unity gain buffer state of the error amplifier 41 as it is, the error amplifier output can be fixed to a constant voltage (VREF), therefore reduction of the voltage amplitude range on the high gain side due to the clock feedthrough of the reset transistor RST-Tr can be compensated for.

In this way, the switch 44 is held in the ON state (connection state) in the reset period and in a predetermined period after releasing reset and holds the error amplifier 41 in the unity gain buffer state. Further, the switch 44 is held in the OFF state (non-connection state) in the reset period and in a predetermined period after releasing reset and releases the error amplifier 41 from the unity gain buffer state.

The horizontal scanning circuit 50 scans signals processed in the plurality of column signal processing circuits such as ADCs of the column readout circuit 40, transfers the results to the horizontal direction, and outputs the same to a not shown signal processing circuit.

The timing control circuit 60 generates timing signals necessary for signal processing of the pixel portion 20, vertical scanning circuit 30, readout circuit 40, horizontal scanning circuit 50, etc.

Input/Output Transmission Characteristic of Pixel PXL

Above, the configurations and functions of the portions in the solid-state imaging device 10 were explained in brief. Next, the input/output transmission characteristic of a pixel PXL according to the first embodiment will be explained.

Figure 7:
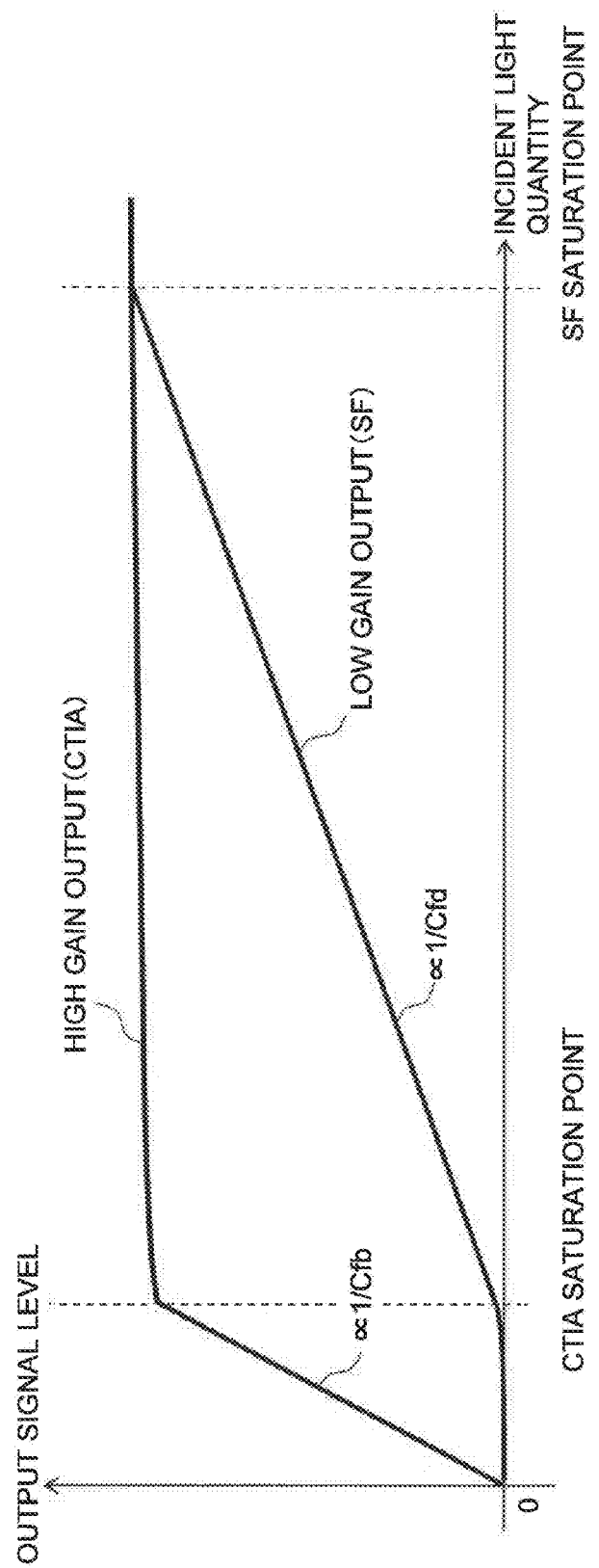
FIG. 7 is a diagram for explaining an input/output transmission characteristic of a pixel according to the first embodiment.

FIG. 7 is a diagram for explaining the input/output transmission characteristic of a pixel according to the first embodiment. In FIG. 7, an abscissa represents an incident light quantity, and an ordinate represents an output signal level.

As seen from the pixel input/output transmission characteristic in FIG. 7, in a low-luminance region having a small incident light quantity, mainly the high gain CTIA circuit operates. The CTIA output is saturated at a CTIA saturation point, so automatically the source-follower transistor SF-Tr (SF circuit) constituting a low gain amplifier of the pixel mainly operates. Here, the CTIA and SF output signal levels were made the same, but may be different values in the present embodiment as well.

Note that, by raising the DC gain of the error amplifier 41, non-linearity at the CTIA saturation start point can be reduced.

Setting of Output Ranges of High Gain and Low Gain

Next, an explanation will be given of setting the output ranges of high gain and low gain in the first embodiment.

Figure 8:
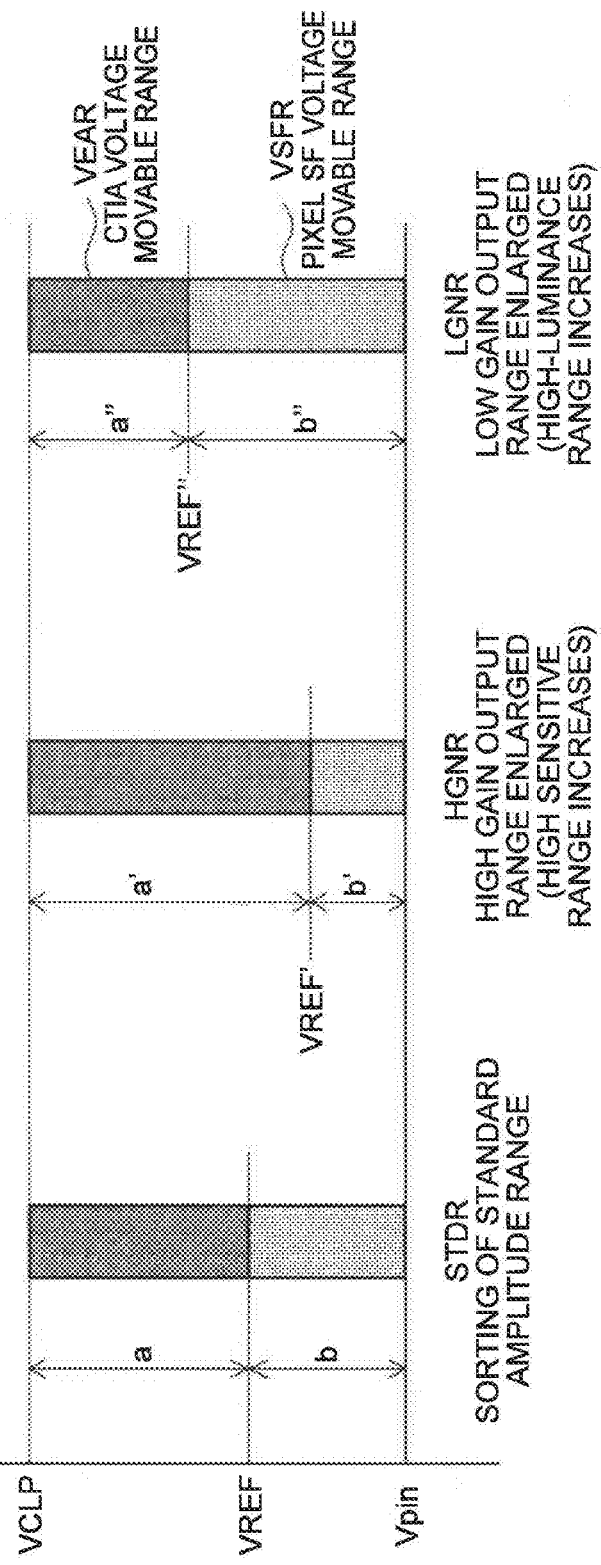
FIG. 8 is a diagram for explaining setting of output ranges of high gain and low gain in the first embodiment.

FIG. 8 is a diagram for explaining setting the output ranges of high gain and low gain in the first embodiment. In FIG. 8, the abscissa shows sorting of cases into standard time STDR, high gain priority time HGNR, and low gain priority time LGNR. The ordinate shows a source-follower (SF) amplifier voltage output range VSFR of a pixel (however, the threshold value is made 0V) and voltage output range VEAR of the error amplifier 41. In FIG. 8, VCLP indicates a clip voltage clipping the output of the error amplifier 41, VREF indicates the reference voltage of the error amplifier 41 at the time of configuration of a unity gain buffer, and Vpin indicates a pinning voltage of the photodiode PD11 (the lowest voltage capable of realizing complete charge transfer from PD11).

As shown in FIG. 8, when a standard combination of high gain and low gain is desired, the reference voltage VREF is set at a side a bit lower than the middle of the clip voltage VCLP and the pinning voltage Vpin (intermediate point is also possible).

When a larger amount of high gain output is needed, a reference voltage VREF' is set closer to the pinning voltage Vpin (relationship of $a'/(a'+b')>a/(a+b)$). Due to this, the dynamic range is reduced, but acquisition of an image with a higher S/N becomes possible.

When a larger amount of low gain output is needed, a reference voltage VREF" is set closer to the clip voltage VCLP (relationship of $a''/(a''+b'')<a/(a+b)$). Due to this, the dynamic range can be expanded.

Further, by adjusting the reference voltage VREF according to the noise floor and light shot noise of the column readout circuit including an ADC, optimization for raising the more practical SNR10 guideline can be realized by just adjustment of the voltage. In a conventional LOFIC pixel, the ranges of high gain and low gain cannot be individually changed.

Further, a configuration dynamically setting the ranges of high gain and low gain is also possible.

Figure 9:
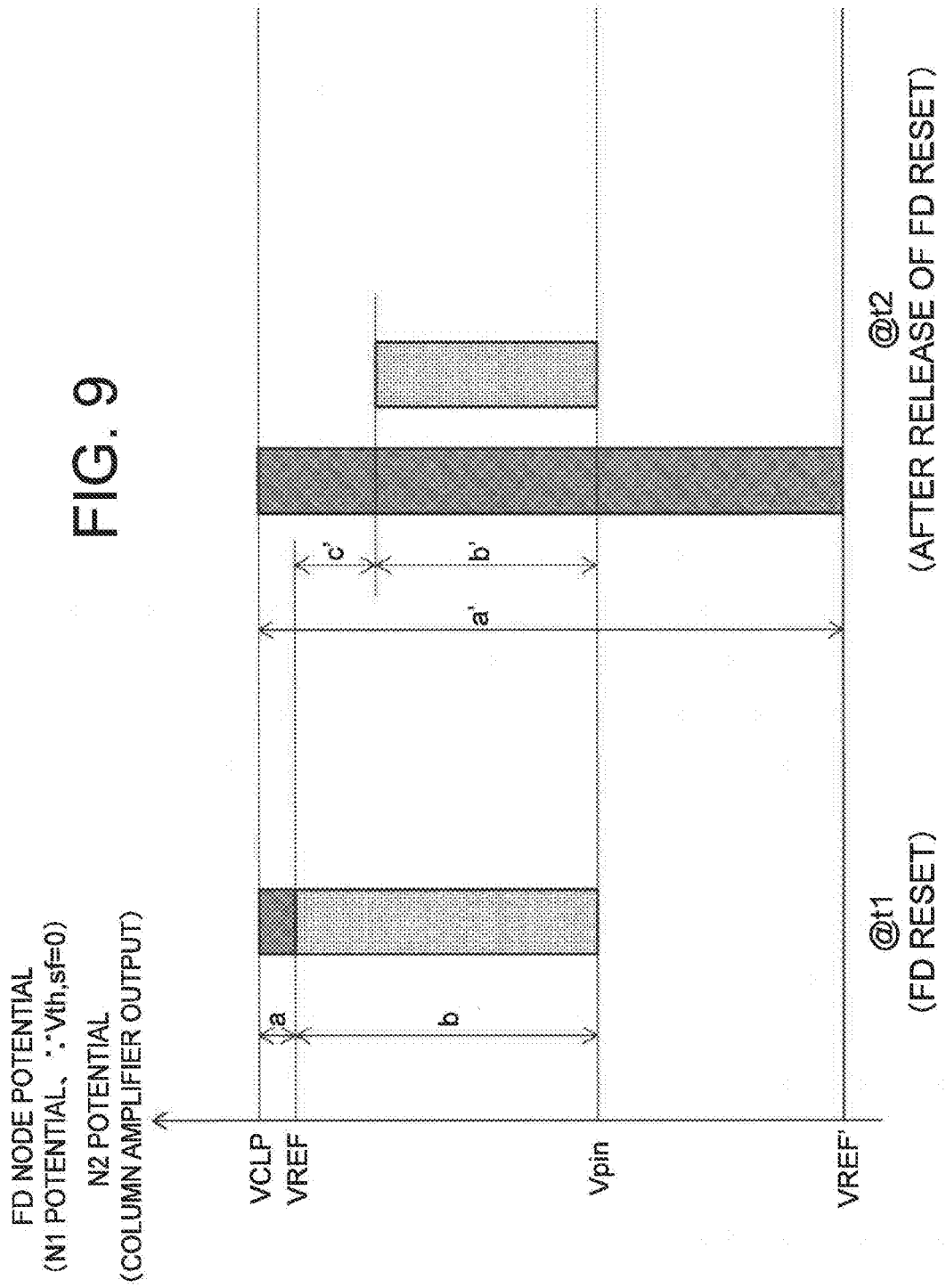
FIG. 9 is a diagram for explaining a case where the output ranges of high gain and low gain are dynamically set in the first embodiment.

FIG. 9 is a diagram for explaining a case where the output ranges of high gain and low gain in the first embodiment are dynamically set. At the time of reset of the floating diffusion FD11 at the time t1, the reference voltage VREF is set in the vicinity of the clip voltage CLIP so that the low gain voltage output becomes the maximum (relationship of $a/(a+b)<<b/(a+b)$). After releasing reset of the floating diffusion FD11 at the time t2, the reference voltage VREF is changed to a voltage which falls by exactly ΔVREF. As a result, a potential difference is caused between the input terminals of the error amplifier 41. However, the output of the error amplifier 41 falls so as to cancel that potential difference. Due to the capacitive negative feedback effect, the final error amplifier output VREF' settles at a voltage falling from the reference voltage VREF by exactly the ΔVEF/feedback rate β ($Cfb11/(Cfb11+Cfd11)$). It is possible to set VREF' to a value sufficiently lower than the pinning voltage Vpin, therefore the high gain voltage range can be made larger than that of a conventional LOFIC pixel (relationship of $a'>>a$). Due to this, the FD node voltage falls by exactly (VREF−VREF')×feedback rate β (Cfb11/(Cfb11+Cfd11)), that is, ΔVREF. However, even if β is 0.125, and (VREF−VREF') is 2V, the loss becomes only about 0.25V (relationship of c'/(b'+c')<<b'/(b'+c')). Therefore, it can be set larger than the pixel SF voltage movable range VSFR in the case of the low gain output range expanded LGNR shown in FIG. 8.

Accordingly, this is effective even when desiring to simultaneously expand both of the high gain voltage range and the low gain voltage range and when desiring to obtain both a sufficient high gain voltage range and low gain voltage range even when the clip voltage VCLP and power supply voltage are lowered.

Stacked Structure of Solid-State Imaging Device 10

Next, the stacked structure of the solid-state imaging device 10 according to the first embodiment will be explained.

Figure 10:
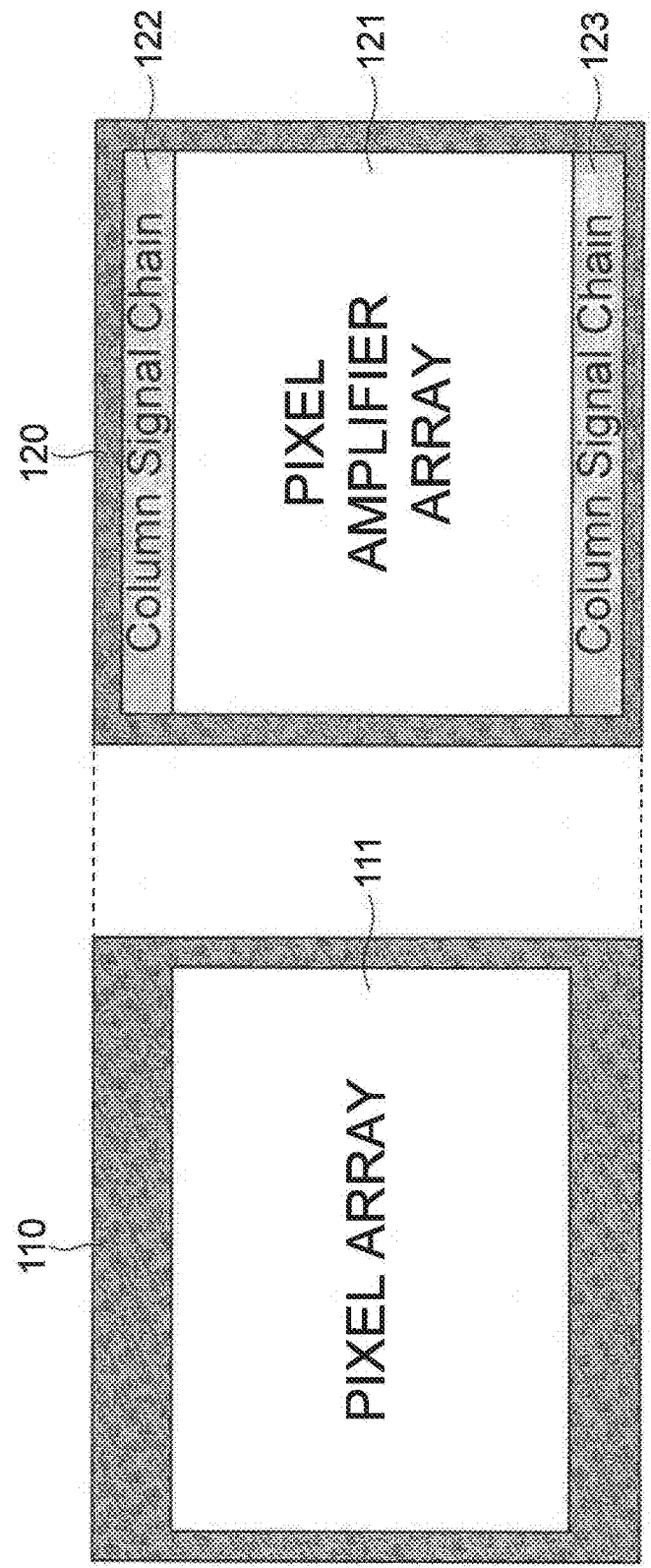
FIG. 10 is a diagram for explaining a stacked structure of a solid-state imaging device according to the first embodiment.

FIG. 10 is a diagram for explaining the stacked structure of the solid-state imaging device 10 according to the first embodiment.

The solid-state imaging device 10 according to the first embodiment has a stacked structure of a first substrate (upper substrate) 110 and second substrate (lower substrate) 120. The solid-state imaging device 10 is for example formed as an imaging apparatus of a stacked structure by bonding the two substrates at the wafer level, then cutting it out by dicing. In the present example, this has a structure of the first substrate 110 stacked on the second substrate 120.

On the first substrate 110, a pixel array portion 111 comprised of the pixel light-receiving portions 21 of the pixels PXL in the pixel portion 20 arrayed in a matrix is formed centered on its center part. Further, on the second substrate 120, a pixel amplifier array portion 121 comprised of the pixel amplification and output sections 22 of the pixels PXL to be connected to the pixel light-receiving portions 21 of the pixel array portion 111 and arrayed in a matrix is formed centered on its center part. Further, at the periphery of the pixel amplifier array portion 121, i.e., in the example in FIG. 10, on the upper side and lower side in the drawing, regions 122 and 123 for the column readout circuit 40 are formed. Note that, the column readout circuit 40 may be configured so as to be arranged at either of the upper side and lower side of the pixel amplifier array portion 121 as well. Further, on the second substrate 120, the vertical scanning circuit 30, horizontal scanning circuit 50, and timing control circuit 60 may be formed as well.

In such a stacked structure, the transfer output sections in the pixel light-receiving portions 21 on the first substrate 110 and the floating diffusions FD11 in the pixel amplification and output sections 22 on the second substrate 120, for example, as shown in FIG. 5, are electrically connected by using vias (die-to-die via) or microbumps etc.

In the first embodiment, each of the pixel light-receiving portions 21 formed in the pixel array portion 111 on the first substrate 110, as shown in FIG. 5, is provided with only the photodiode PD11 and transfer transistor TG-Tr. Further, the charge which is generated by the photoelectric conversion is transmitted as is to the second substrate 120 side.

In the first embodiment, in the pixel array portion 111 on the first substrate 110 side, the number of transistors needed can be decreased to the minimum limit, therefore the photoelectric conversion region can be broadened up to the maximum limit, so realization of increased sensitivity by raising the quantum efficiency becomes possible. That is, a higher quantum efficiency can be achieved.

Reading Operation of Solid-State Imaging Device 10

Above, the characteristic configurations and functions of the portions in the solid-state imaging device 10 were explained. Next, a reading operation etc. of the solid-state imaging device 10 according to the first embodiment will be explained in detail.

FIG. 11A to FIG. 11I are one-row timing charts for explaining the reading operation of the solid-state imaging device according to the first embodiment. FIG. 12A to FIG. 12K are two-row timing charts for explaining the reading operation of the solid-state imaging device according to the first embodiment.

Figure 11:
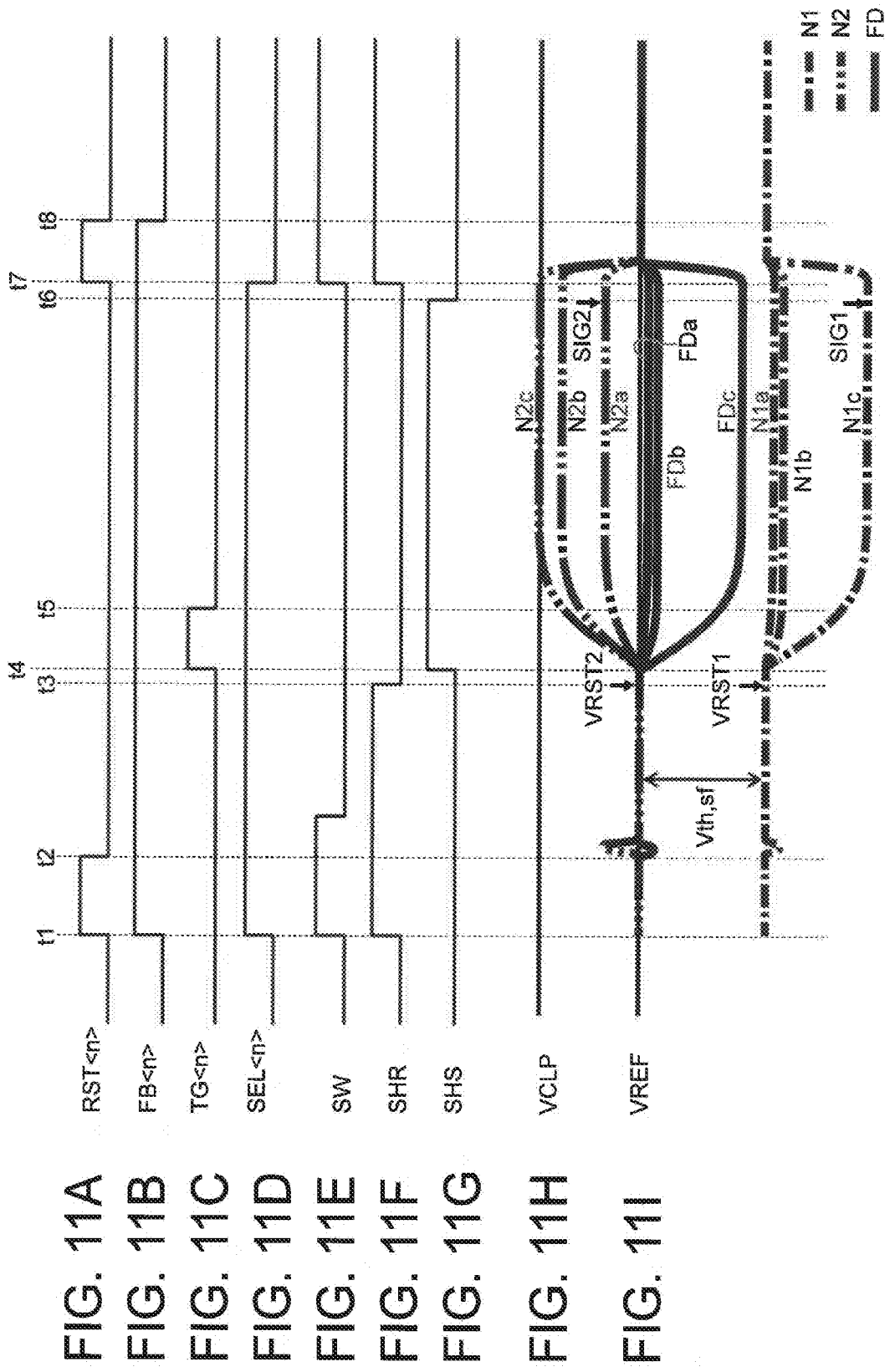
FIG. 11A to FIG. 11I are one-row timing charts for explaining a reading operation of a solid-state imaging device according to the first embodiment.
Figure 12:
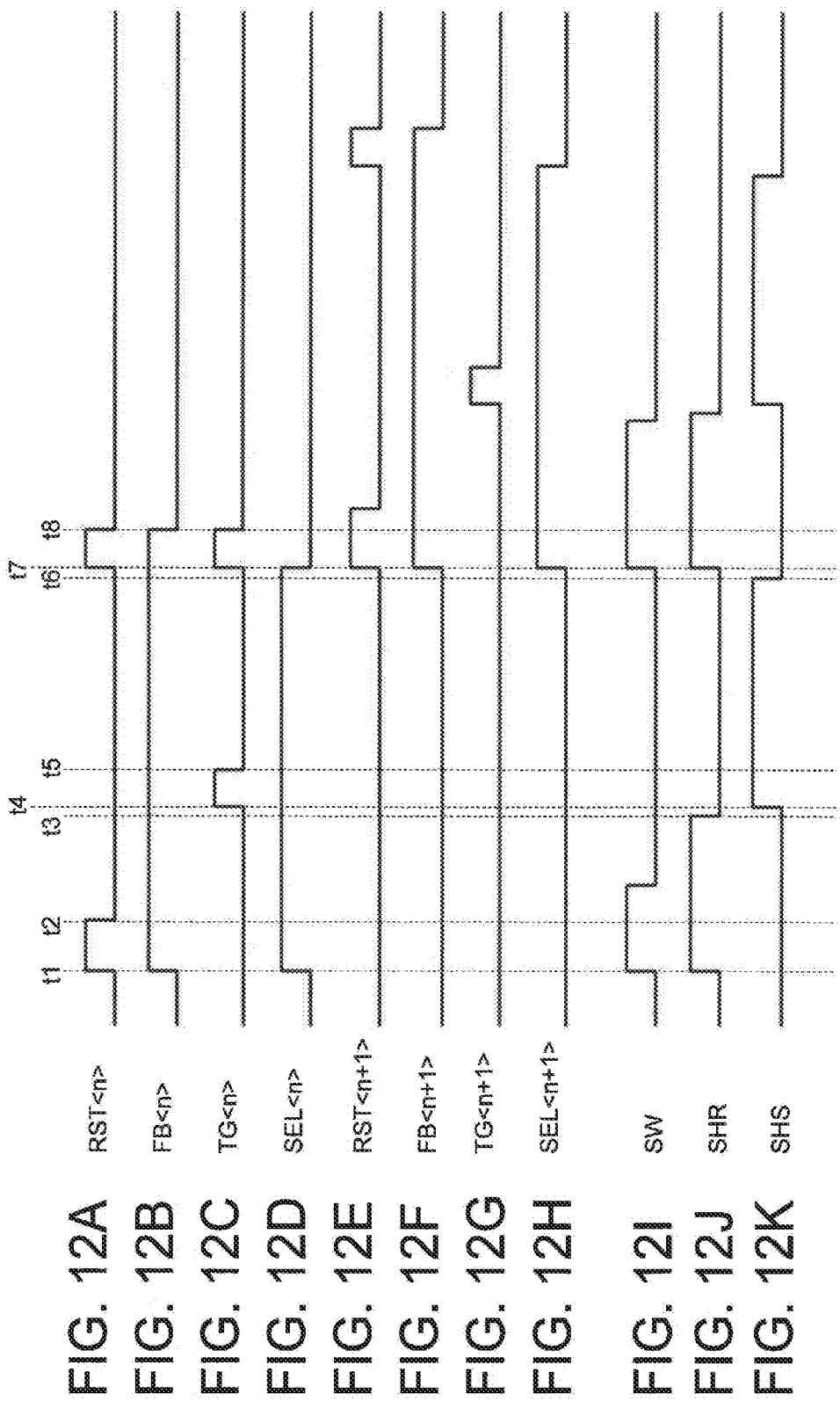
FIG. 12A to FIG. 12K are two-row timing charts for explaining a reading operation of a solid-state imaging device according to the first embodiment.

As shown in FIG. 11I, the SF amplifier output of the pixel PXL, that is, the readout voltage (signal voltages) N1 (VRST1, VSIG1) of a low gain output to the first vertical signal line LSGN11 has a waveform similar to the node voltage (indicated by solid line) of the floating diffusion FD11 of the pixel PXL falling by the amount of the threshold voltage (Vth, sf) of the source-follower transistor SF-Tr (indicated by one-dot chain line). Further, FIG. 11I shows also the readout voltage (signal voltage) N2 (VRST2, VSIG2) of a high gain output to the second vertical signal line LSGN12 (indicated by two-dot chain line).

In FIG. 11I, three types ("a", "b", and "c") of incident light quantity characteristics are shown. In FIG. 11I, "a" indicates the characteristic of the smallest incident light quantity, and "c" indicates the characteristic of the largest quantity. In FIG. 11I, "c" indicates a state where the high gain output is saturated and clipped to the clip voltage VCLP. FIG. 11I shows that, until the high gain output is saturated, the low gain output does not change much at all. FIG. 11I shows that the low gain output changes when the high gain output is saturated.

In FIG. 11A to FIG. 11I, the time t1 to t2 is a node reset period of the floating diffusion FD11. Here, in order to select a certain single row in the pixel array, the control signal SEL<n> which is applied to the control line LSEL connected to a pixel PXL in that selected row is set at an H level and the selection transistor SEL-Tr of the pixel PXL becomes a conductive state. In the same way, the control signal FB<n> which is applied to the control line LFB connected to a pixel PXL in that selected row is set at an H level and the feedback transistor FB-Tr of the pixel PXL becomes a conductive state. Due to this, a state where the feedback capacitor C11 of the pixel PXL is electrically connected to the second vertical signal line LSGN12 is exhibited.

Further, in the column readout circuit 40, the control signal SW of the switch 44 is set at an H level and the error amplifier 41 becomes a unity gain buffer state. At this time, the source-follower output of the pixel and the error amplifier input are decoupled by the serial capacitor C41 (Cc) provided at an input stage (front stage) of the error amplifier 41. Therefore, even if the error amplifier 41 becomes the unity gain buffer state (state where the switch 44 is ON), the amplifier of the source-follower transistor SF-Tr of the pixel PXL can be operated in a saturated state. Further, at this time, the control signal SHR for controlling ON/OFF the reset-use sampling switch 421 of the high gain-use sampling circuit 42 and the reset-use sampling switch 431 of the low gain-use sampling circuit 43 is set at an H level, so the reset-use sampling switches 421 and 431 become the ON state.

In this selection state, as shown in FIG. 11A to FIG. 11I, at time t1 to t2, during the node reset period of the floating diffusion FD11, the reset transistor RST-Tr is selected and becomes a conductive state for a period where the control signal RST<n> applied to the control line LRST is at an H level, and the potential of the floating diffusion FD11 and the second vertical signal line LSGN12 of the output of the error amplifier 41 are reset to the reference voltage VREF and fixed. After the time t2 at which this reset period has passed (the reset transistor RST-Tr is in a nonconductive state), the period up to the time t3 at which the control signal SHR is switched to an L level before the start of transfer period becomes a settling period after release of reset of the FD node. At this time, the control signal SW of the switch 44 is set at an H level as it is, therefore the error amplifier 41 is held in the unity gain buffer state as it is. Accordingly, by releasing the FD node reset state, the output of the error amplifier 41 can be fixed to the constant voltage (VREF), therefore reduction of the voltage amplitude range on the high gain side by the clock feedthrough of the reset transistor RST-Tr can be compensated for.

By releasing the FD node reset state, the readout reset voltage N2 (VRST2) of a high gain is output to the second vertical signal line LSGN12, and this readout reset voltage VRST2 is supplied to the high gain-use sampling circuit 42. In the same way, the readout reset voltage N1 (VRST1) of a low gain is output to the first vertical signal line LSGN11, and this readout reset voltage VRST1 is supplied to the low gain-use sampling circuit 43.

Then, at the time t3, the readout reset voltage VRST2 of a high gain is sampled by the high gain-use sampling circuit 42. Then, simultaneously in parallel, the readout reset voltage VRST1 of a low gain is sampled by the low gain-use sampling circuit 43.

The time t4 to t5 becomes the transfer period of the accumulated charge since the readout period of the reset voltage ends. During the transfer period, the transfer transistor TG-Tr is selected and becomes a conductive state in the period where the control signal TG<n> applied to the control line LTG is at an H level, and the charge (electrons) which is photoelectrically converted and accumulated in the photodiode PD11 is transferred to the floating diffusion FD11.

In this case, the readout signal voltage N2 (VSIG) of a high gain output to the second vertical signal line LSGN12 with which the output of the error amplifier 41 is connected rises. Contrary to this, the node voltage of the floating diffusion FD11 and the voltage of the SF amplifier output with a low gain of the pixel output to the first vertical signal line LSGN11 fall. This means that the output side of the error amplifier 41 continuously rises until saturation, and the SF amplifier output voltage begins to fall when saturation begins. In this case, the gain is high, therefore the quantity of change on the output side of the error amplifier 41 is larger than the quantity of change of the SF amplifier output voltage of the pixel.

Note that, at the time t4, the control signal SHS for controlling ON/OFF the signal-use sampling switch 422 of the high gain-use sampling circuit 42 and the signal-use sampling switch 432 of the low gain-use sampling circuit 43 is set at an H level, and the signal-use sampling switches 422 and 432 become the ON state.

After the time t5 at which this transfer period has passed (the transfer transistor TG-Tr is in a nonconductive state), a signal voltage readout period arrives for reading the signal voltage VSIG in accordance with the charge photoelectrically converted and accumulated in the photodiode PD11. In other words, the time t5 to t6 is a settling period after transfer of the signal charge.

In this period, the readout signal voltage N2 (VSIG2) of a high gain is output to the second vertical signal line LSGN12, and this readout signal voltage VSIG2 is supplied to the high gain-use sampling circuit 42. In the same way, the readout signal voltage N1 (VSIG1) of a low gain is output to the first vertical signal line LSGN11, and this readout signal voltage VSIG1 is supplied to the low gain-use sampling circuit 43.

Then, at the time t6, the readout signal voltage VSIG2 of a high gain is sampled by the high gain-use sampling circuit 42. Then, simultaneously in parallel, the readout signal voltage VSIG of a low gain is sampled by the low gain-use sampling circuit 43.

Then, for example, in the column readout circuit 40 configuring part of the readout portion 70, a difference operation (VRST2−VSIG2) is performed on the signal voltage VSIG2 of a high gain and the reset voltage VRST2 of a high gain to extract the signal component. In the same way, a difference operation (VRST1−VSIG1) is performed on the signal voltage VSIG1 of a low gain and the reset voltage VRST1 of a low gain to extract the signal component.

Note that, when very strong light is incident, electrons overflow from the photodiode PD11 and flow into an adjacent pixel and thereby form artifacts. Accordingly, by setting the OFF voltage sufficiently lower than its own threshold voltage and a bit higher than 0V, a path is formed making the overflowing charge flow to the vertical signal line and thus blooming can be reduced.

Next, an explanation will be given of the operation at the time t7 to t8 in FIG. 12A to FIG. 12K showing the basic timings of two rows. The time t7 to t8 is the PD reset period (electron shutter function) and re-initialization period of the FD node. In this period, in order to realize an electron shutter, the PD11 is reset by using the FD reset period of any row. Further, by resetting the FD node again immediately after reading the signal, the influence by the memory effect is cancelled.

In this case, in the n-th row, the control signal SEL<n> which is applied to the control line LSEL connected to each pixel PXL is set at an L level and the selection transistor SEL-Tr of the pixel PXL becomes a nonconductive state. The control signal FB<n> which is applied to the control line LFB connected to each pixel PXL in that non-selected row is set at an H level and the feedback transistor FB-Tr of the pixel PXL becomes a conductive state. Due to this, a state of electrical connection of the feedback capacitor C11 of the pixel PXL with the second vertical signal line LSGN12 is exhibited.

During this non-selection state, in the reset period of the time t7 to t8, the reset transistor RST-Tr is selected and becomes a conductive state in the period where the control signal RST applied to the control line LRST is at an H level. In the same way, the transfer transistor TG-Tr is selected and becomes a conductive state in the period where the control signal TG<n> applied to the control line LTG is at an H level. Due to this, the photodiode PD11 and FD11 node are reset to the potential of the second vertical signal line LSGN12.

In the n+1-th row, the control signal SEL<n+1> applied to the control line LSEL connected to each pixel PXL is set at an H level and the selection transistor SEL-Tr of the pixel PXL becomes a conductive state. The control signal FB<n+1> which is applied to the control line LFB connected to each pixel PXL in that selected row is set at an H level and the feedback transistor FB-Tr of the pixel PXL becomes a conductive state. Due to this, a state of electrical connection of the feedback capacitor C11 of the pixel PXL with the second vertical signal line LSGN12 is exhibited.

In this selection state, during the reset period of the time t7 to t8, the reset transistor RST-Tr is selected and becomes a conductive state in the period where the control signal RST applied to the control line LRST is at an H level. On the other hand, the transfer transistor TG-Tr is selected and becomes a nonconductive state in the period where the control signal TG<n+1> applied to the control line LTG is at an L level. Due to this, the node of the floating diffusion FD11 is reset to the potential of the second vertical signal line LSGN12.

Next, the reading operation of the solid-state imaging device 10 according to the first embodiment will be explained with reference to potential diagrams.

Figure 13:
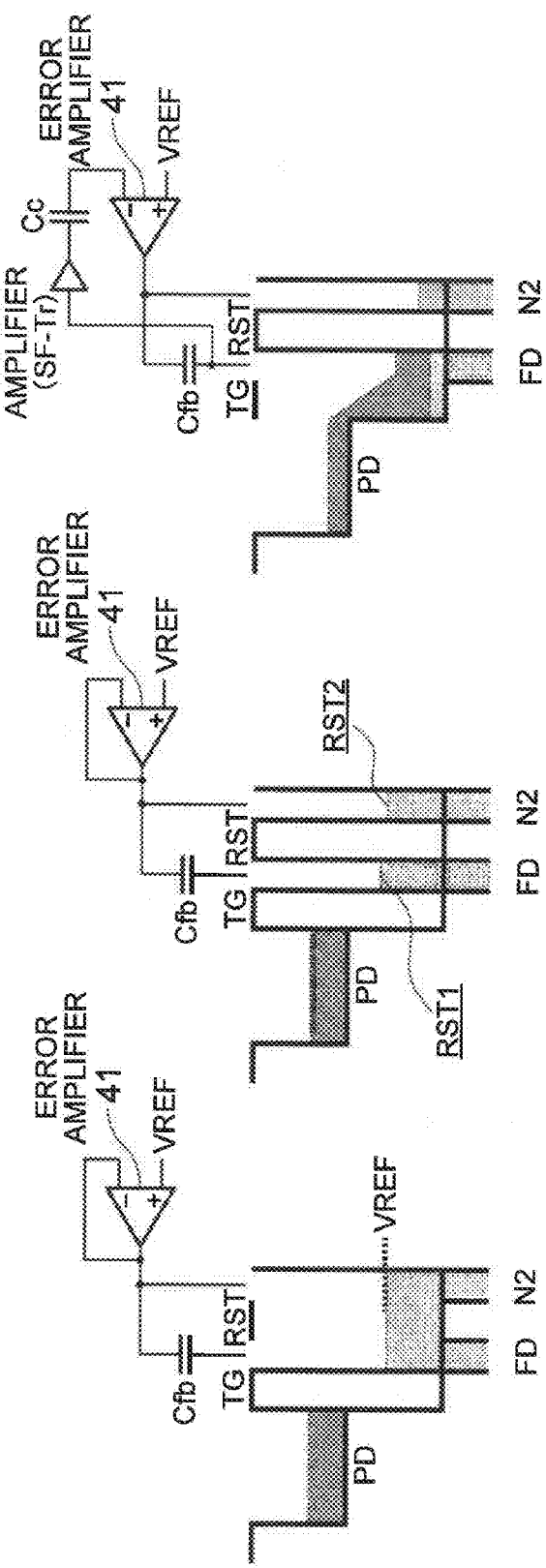
FIG. 13A to FIG. 13C are first potential diagrams for explaining the reading operation of a solid-state imaging device according to the first embodiment.
Figure 14:
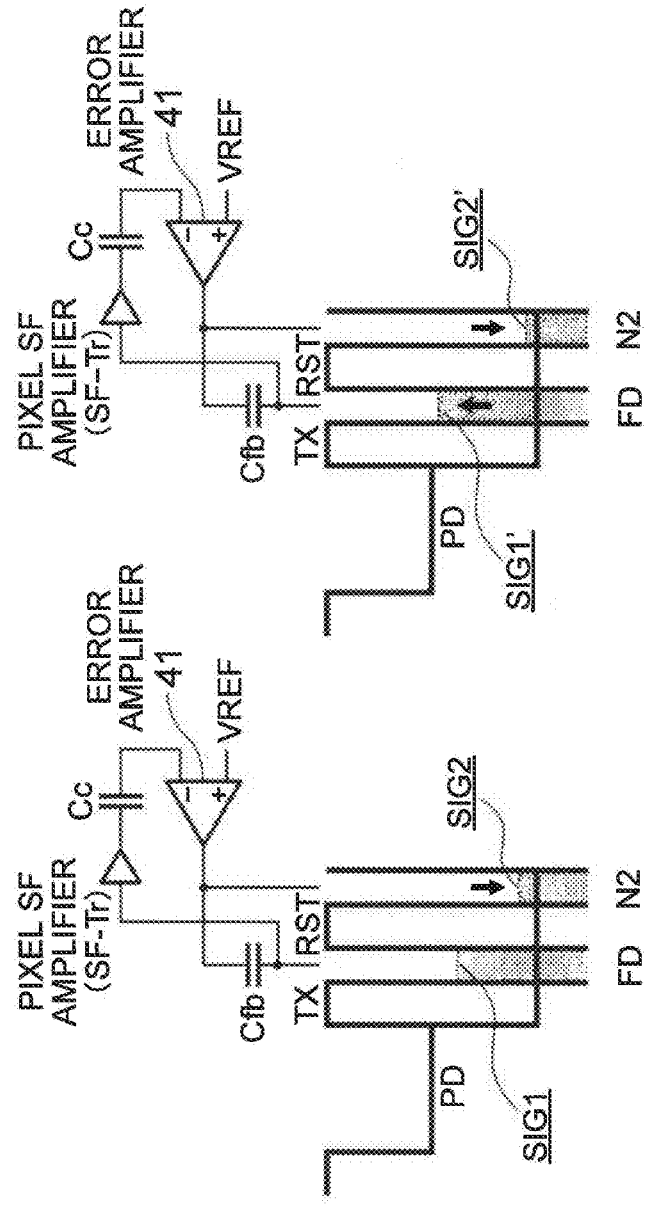
FIG. 14A and FIG. 14B are second potential diagrams for explaining the reading operation of a solid-state imaging device according to the first embodiment.

FIG. 13A to FIG. 13C are first potential diagrams for explaining the reading operation of the solid-state imaging device according to the first embodiment. FIG. 14A and FIG. 14B are second potential diagrams for explaining the reading operation of the solid-state imaging device according to the first embodiment.

FIG. 13A to FIG. 13C and FIG. 14A and FIG. 14B show transitions of potential state in the principal nodes based on the timings in FIG. 11A to FIG. 11I. FIG. 13A shows the FD reset state at the time t1, FIG. 13B shows the state after releasing the FD reset at the time t2, FIG. 13C shows the state of signal charge transfer of the PD11 at the time t4, FIG. 14A shows the state at the time of low luminance at the time t6, and FIG. 14B shows the state at the time of high luminance at the time t6.

As shown in FIG. 13A, at the time t1, the reset transistor RST-Tr is selected and becomes a conductive state in the period where the control signal RST applied to the control line LRST is at an H level. Further, the control signal SW of the switch 44 is set at an H level and the error amplifier 41 becomes the unity gain buffer state. Due to this, the node of the floating diffusion FD11 is connected to the second vertical signal line LSGN12 and becomes the reference voltage VREF.

As shown in FIG. 13B, at the time t2, after releasing reset of the FD11 node, the node of the floating diffusion FD11 and the output (N2) of the error amplifier 41 change from the reference voltage VREF by exactly the amount of noise and settles. The output (N2) of the error amplifier 41 is fixed at the voltage VREF at the time of releasing reset of FD11, therefore the influence due to clock feedthrough from the reset transistor RST-Tr can be cancelled. The voltages (VRST1, VRST2) at the time t3 after settling are simultaneously sampled and made the initial potential.

As shown in FIG. 13C, at the time t4, the transfer transistor TG-Tr is selected and becomes a conductive state in the period where the control signal TG applied to the control line LTG is at an H level. Due to this, the charge is transferred from the photodiode PD11 to the floating diffusion FD11. At this time, the error amplifier itself is given an open loop configuration. A pixel SF amplifier and a pixel capacitance feedback circuit are combined and are operated as a large CTIA circuit. The voltages (VSIG1, VSIG2) at the time t6 after settling are simultaneously sampled to obtain an optical signal potential.

As shown in FIG. 14A, at the time t6, after settling of the charge transfer at the time of low luminance, the FD11 node maintains the state after settling of release of FD11 reset at the time t3 due to the negative feedback effect. As the SF amplifier output of the pixel, a voltage which falls from the node potential of the floating diffusion FD11 by the amount of the threshold voltage (Vth,sf) is output. Accordingly, almost no signal change occurs on the low gain side.

On the other hand, the error amplifier output (N2) is amplified to a high gain by the CTIA circuit. By simultaneously sampling the potentials (VSIG1, VSIG2) at this time and performing a differential operation with the initial potentials (VRST1, VRST2), the offset of each amplifier is cancelled, and only the optical signal component is detected with a high precision.

As shown in FIG. 14B, at the time t6', the CTIA circuit maintains a saturated state after settling of the charge transfer at the time of high luminance. Excessive electrons which could not be handled in the CTIA circuit gather at the node of the floating diffusion FD11 and make the node potential of the floating diffusion FD11 fall. Accordingly, on the high gain side, an output voltage in the saturated state is obtained, and a large signal change is obtained even on the low gain side. By simultaneously sampling the potentials (VSIG1, VSIG2) at this time and performing a differential operation with the initial potentials (VRST1, VRST2), the offset of each amplifier is cancelled, and only the optical signal component is detected with a high precision.

Explanation of Principle Why High Sensitivity Output and Low Sensitivity Output are Possible Next, the principle why high sensitivity output and low sensitivity output are possible in the solid-state imaging device 10 according to the first embodiment having the configurations and functions described above will be explained with reference to mathematical models of pixel output.

Figure 15:
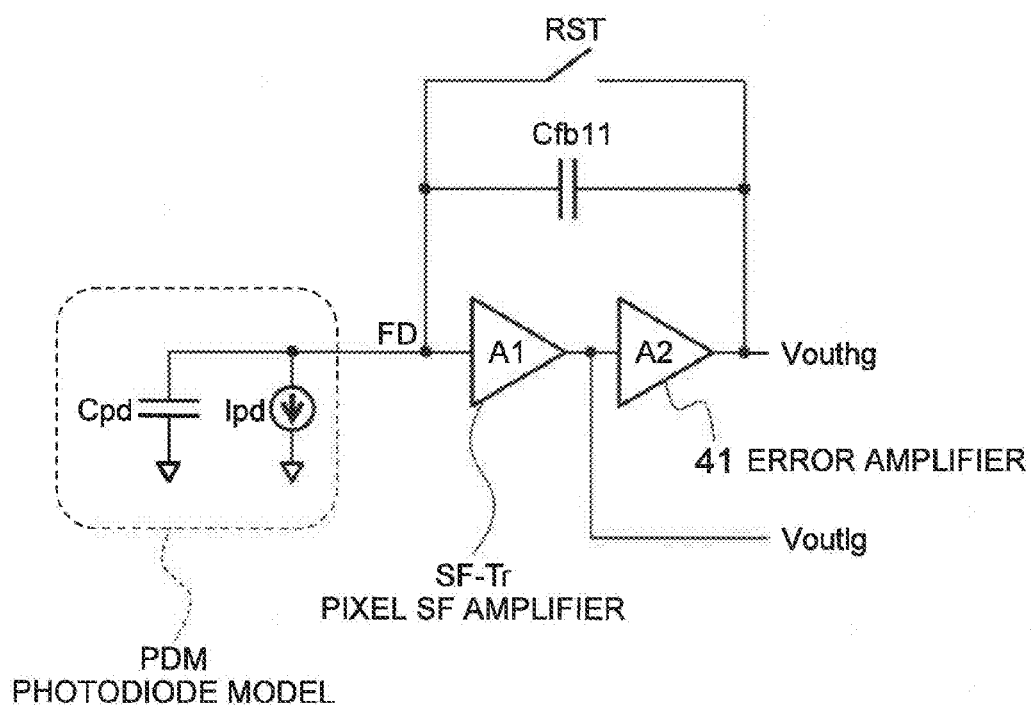
FIG. 15 is a diagram for explaining the principle that high sensitivity output and low sensitivity output are possible in a solid-state imaging device according to the first embodiment.

FIG. 15 is a diagram for explaining the principle why high sensitivity output and low sensitivity output are possible in the solid-state imaging device 10 according to the first embodiment.

Principle Why High Sensitivity Output is Possible

Here, as shown in FIG. 15, the photodiode PD modelizes the photoelectric conversion function as a photodiode model PDM by a current source Ipd and capacitance Cpd. As shown in the following Equation 1, a differential equation with respect to the FD node is established. A1 is the gain (made 1.0) of the pixel SF amplifier, and A2 is the DC gain (made larger than 10,000×) of the error amplifier 41. The product of A1 and A2 can be made very high, therefore the pixel output is proportional to 1/Cfb. In a conventional configuration where there is an error amplifier in the pixel, it is difficult to raise the gain of the error amplifier up to a sufficient level. However, this can be carried out in the present system, therefore a higher sensitivity pixel characteristic can be obtained.

Principle Why Low Sensitivity Output is Possible

When the high sensitivity output is saturated, the remaining excessive electrons gather at the capacitance Cpd (Cfd in the case of 4Tr pixel). The pixel output is proportional to 1/Cpd. Accordingly, when the capacitance Cpd is sufficiently large, even a high luminance input can be output without saturation of the pixel output, therefore detail of the high-luminance object can be reproduced.

Differential Equation Etc. Concerned with Mathematical Models

Higher increased sensitivity than the conventional 4Tr-APS pixel using $C_{fd}$ as the conversion capacitance is realized (high gain output) when the following equations stand:

$$I_{pd}(s) + \left(\frac{v_{outhg}(s)}{A_1 A_2} + v_{outhg}(s)\right) sC_{fb} + \frac{v_{outhg}(s)}{A_1 A_2} + sC_{pd} = 0 \qquad (1)$$

-continued $$v_{outhg}(s) = \frac{I_{pd}(s)}{sC_{fb}\left(1-\left(1+\frac{C_{pd}}{C_{fb}}\right)\frac{1}{A_1A_2}\right)} \text{ if } A_1A_2 \gg \left(1+\frac{C_{pd}}{C_{fb}}\right), \text{ then} \quad (2)$$

$$v_{outhg}(t) \approx \frac{1}{C_{fb}}\int I_{pd}(t)d \quad (3)$$

when $C_{fd} \gg C_{fb}$.

In Equation (2), when $A_2$ is removed and $A_1$ is assumed to be equal to 1, a low gain output which can be expressed by the following equation is obtained:

$$v_{outhg}(t) \approx \frac{1}{C_{pd}}\int (I_{pd}(t) - I_{pd,hg})dt \quad (4)$$

$I_{pd,hd}$ is the quantity of the current which is necessary for saturation of the high gain output.

As explained above, according to the first embodiment, when the charge from the photodiode (photoelectric conversion element) is small, the solid-state imaging device 10 transfers all of the charge to the feedback capacitor to obtain the output voltage amplified with a high gain due to the mirror effect created by the capacitive trans-impedance amplifier (CTIA) circuit including the amplifier arranged in the column readout circuit 40 and the feedback capacitor. When the CTIA circuit is saturated, it moves the remaining excessive charge to the floating diffusion FD11 having a larger capacitance and thereby obtains the output voltage amplified with a low gain due to automatic reduction of the mirror effect.

In this way, the solid-state imaging device 10 in the first embodiment can read out the signal voltage amplified to two types of a high gain and low gain simultaneously in parallel and sample the signal voltages of a high gain and low gain simultaneously in parallel, can read out a low luminance signal with a high gain, can read out a high luminance signal with a low gain suppressing saturation, and in addition can obtain signals of a high gain and low gain by two reading operations. Further, it is configured so that the lowest object illuminance performance can be improved.

More specifically, the solid-state imaging device 10 in the present embodiment can read out the CTIA output and the SF amplifier output simultaneously in parallel, therefore can complete the operation by two reading operations, so it becomes possible to realize a higher frame rate even in a multi-pixel image sensor. By making the feedback capacitor C11 having a capacitance Cfb11 an MOM (metal-oxide-metal) capacitor, there is less manufacturing variation than a conventional 4Tr-APS pixel and a linear response characteristic having a smaller voltage dependency and increased sensitivity can be realized. The error amplifier 41 which is necessary for CTIA can be mounted in the column circuit capable of using a broader area, therefore both high DC gain and high speed can be achieved, so a higher precision and higher speed reading operation than a conventional CTIA pixel can be realized.

Further, by decoupling the pixel SF amplifier (SF-Tr) output and the error amplifier input by the serial capacitor C41 (capacitance (Cc)) provided at the front stage of the error amplifier 41, even if the error amplifier 41 becomes the unity gain buffer state, the pixel SF amplifier can be operated in a saturated state. By releasing the pixel reset state while keeping the error amplifier 41 in the unity gain buffer state as it is, the error amplifier output can be fixed to a constant voltage (VREF), and the reduction of the voltage amplitude range on the high gain side due to the clock feedthrough of the reset transistor (RST-Tr) can be compensated for. Further, the thermal noise of the feedback transistor FB-Tr can be further lowered by the band limiting capacitor C12 (Clim).

In the solid-state imaging device 10 in the first embodiment, as explained above, when the charge from the photodiode PF11 is small, the charge is all transferred to the feedback capacitor C11 (capacitance Cfb) due to the mirror effect created by the CTIA circuit, therefore an output voltage amplified with a high gain is obtained. On the other hand, when the CTIA circuit is saturated, the mirror effect is automatically reduced, therefore the remaining excessive charge moves to the Cfd having a larger capacitance and thus an output voltage amplified with a low gain is obtained. Accordingly, compared with a conventional LOFIC pixel, the characteristic feature resides in that switching of the gain does not require pulse driving and is automatically carried out. Due to this, no factors of superimposition of channel charges due to driving transistors for gain switching or of clock feedthrough charge loss due to fluctuation of a threshold value of a substrate bias effect are generated in principle, therefore the number of charges from the photodiode can be accumulated. As a result, no discontinuous points are generated when combining high gain and low gain, therefore they can be connected with a high precision.

Further, the solid-state imaging device 10 according to the first embodiment has a stacked structure of a first substrate (upper substrate) 110 and second substrate (lower substrate) 120. On the first substrate 110, a pixel array portion 111 comprised of the pixel light-receiving portions 21 of the pixels PXL in the pixel portion 20 arrayed in a matrix is formed centered on its center part. Further, on the second substrate 120, a pixel amplifier array portion 121 comprised of the pixel amplification and output sections 22 of the pixels PXL to be connected to the pixel light-receiving portions 21 of the pixel array portion 111 and arrayed in a matrix is formed centered on its center part. Further, at the periphery of the pixel amplifier array portion 121, regions 122 and 123 for the column readout circuit 40 are formed. In the first embodiment, each of the pixel light-receiving portions 21 formed in the pixel array portion 111 on the first substrate 110 is provided with only a photodiode PD11 and transfer transistor TG-Tr. Further, the charge generated according to the photoelectric conversion is transmitted as it is to the second substrate 120 side.

Accordingly, in the first embodiment, in the pixel array portion 111 on the first substrate 110 side, the number of transistors needed can be decreased to the minimum limit, therefore the photoelectric conversion region can be broadened up to the maximum limit, so realization of increased sensitivity by raising the quantum efficiency becomes possible. That is, a higher quantum efficiency can be achieved.

Second Embodiment

Figure 16:
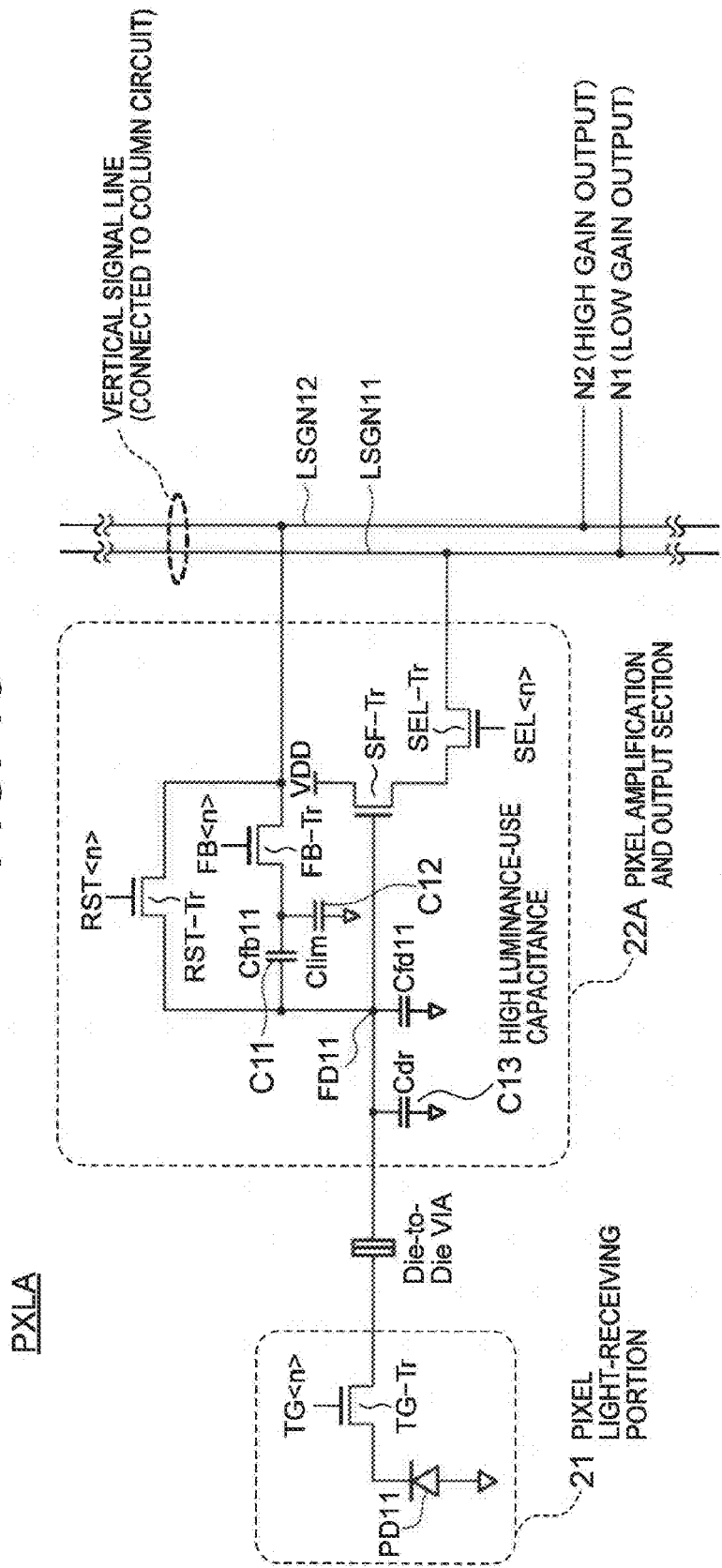
FIG. 16 is a diagram showing an example of the configuration of a pixel according to a second embodiment of the present invention.

FIG. 16 is a diagram showing an example of the configuration of a pixel according to a second embodiment of the present invention.

The difference of the pixel PXLA in the second embodiment from the pixel PXL in the first embodiment is as follows. In the pixel PXLA in the second embodiment, a high luminance-use capacitor C13 having a capacitance Cdr is connected to the node of the floating diffusion FD11.

In the pixel PXLA in the second embodiment, by connecting the high luminance-use capacitor C13 having a capacitance Cdr to the node of the floating diffusion FD11 (FD node) and making the FD node capacitance larger, detail of a higher luminance subject can be obtained while suppressing saturation. Even if the FD node capacitance increases by addition of the high luminance-use capacitor C13 having the capacitance Cdr, the drop in the conversion gain on the high gain side is suppressed to 1/(1+Adc) due to the negative feedback mechanism, therefore almost no influence is exerted (Adc represents the DC gain of the error amplifier 41 and is generally 10,000× or more).

Contrary to this, in a conventional CTIA pixel, when a general operating current flows, the Adc is smaller than 100×, therefore the influence of the high luminance-use capacitance Cdr is not sufficiently relieved and therefore the conversion gain falls and the high sensitivity characteristic deteriorates. Further, in order to make the sensitivity up to about 1,000×, considered to be the upper limit from that in this amplifier configuration in the usual process, it is necessary to drastically lower the operating current. Therefore, as a result, the problem of a fall of the readout speed arises.

Third Embodiment

Figure 17:
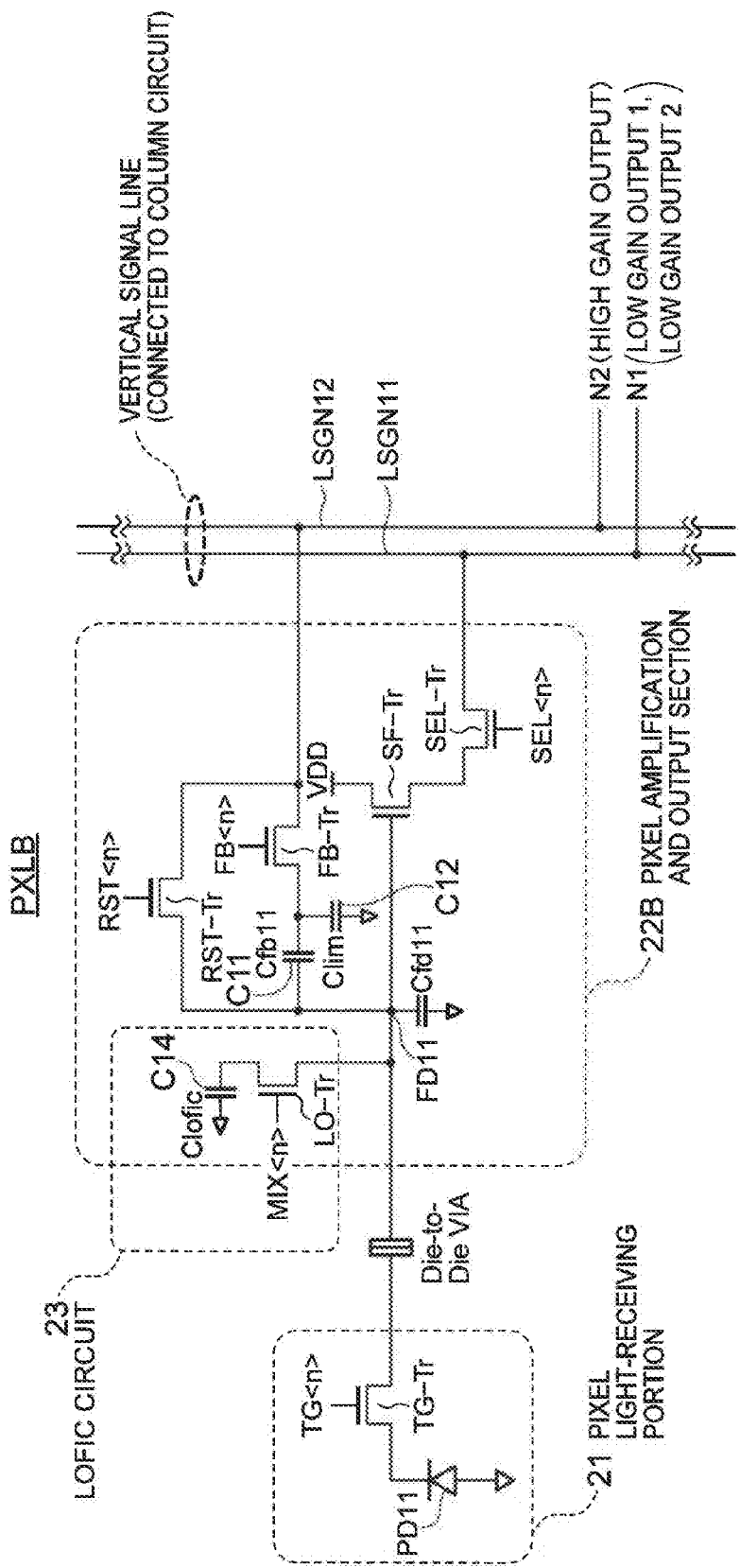
FIG. 17 is a diagram showing an example of the configuration of a pixel according to a third embodiment of the present invention.

FIG. 17 is a diagram showing an example of the configuration of a pixel according to a third embodiment of the present invention.

The difference of the pixel PXLB in the third embodiment from the pixel PXL in the first embodiment is as follows. In the pixel PXLB in the third embodiment, the LOFIC circuit 23 configured by the LOFIC capacitor C14 (capacitance (Clofic)) and transistor LO-Tr is connected to the node of the floating diffusion FD11. The LOFIC circuit 23 is added to the pixel amplification and output section 22. The LOFIC circuit 23 corresponds to a circuit capable of selectively adding a predetermined capacitance to the capacitance of the floating diffusion FD11.

By adding the LOFIC circuit 23 capable of setting a middle gain to the pixel amplification and output section 22 in this way, three different gains (high gain, middle gain, and low gain) can be provided. Due to this, the dynamic range can be further increased. Further, by rendering the transistor LO-Tr the ON state all the time, it is also possible to make this pixel operate as a pixel provided with two different gains (high gain and low gain).

Fourth Embodiment

Figure 18:
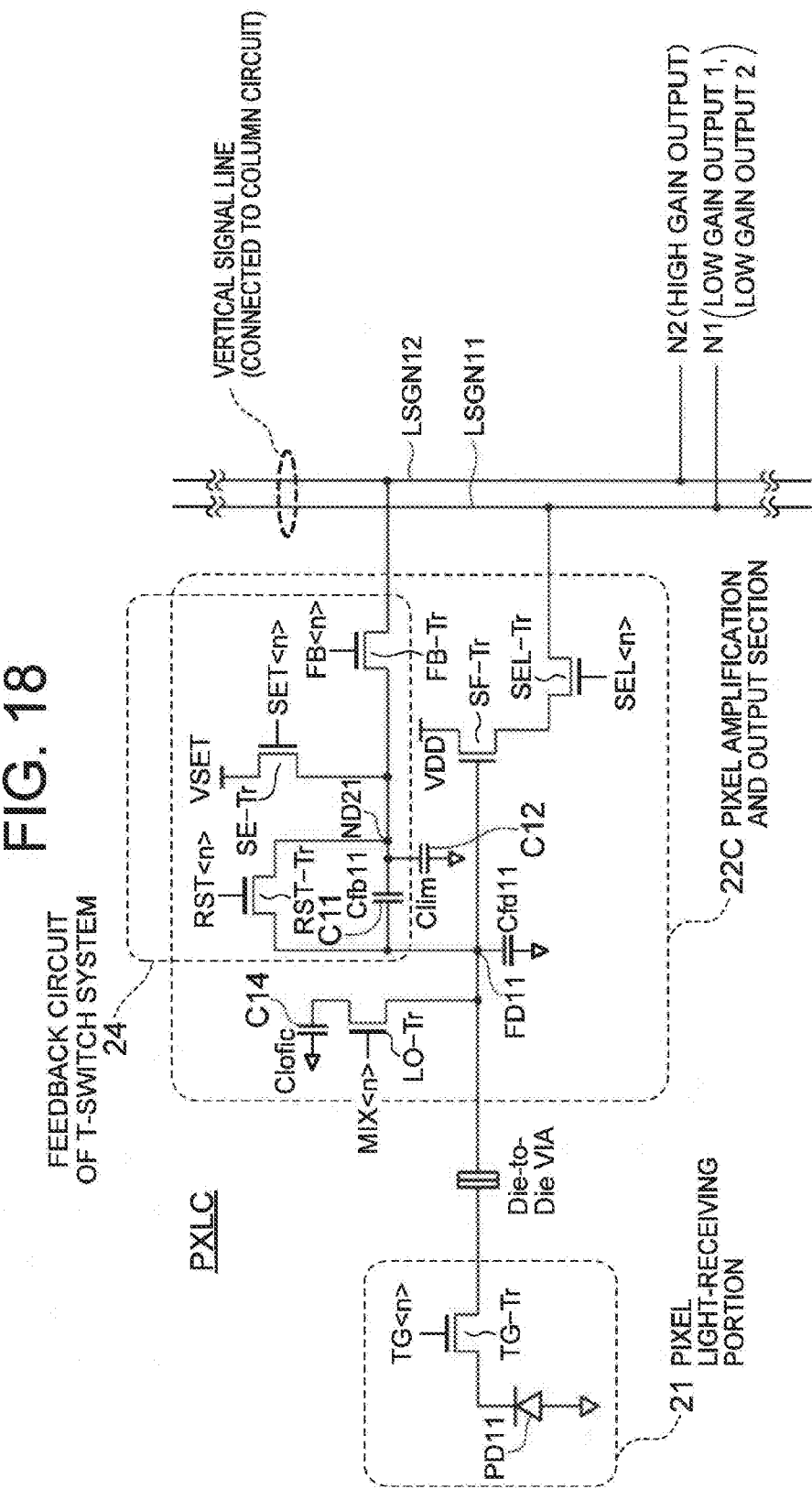
FIG. 18 is a diagram showing an example of the configuration of a pixel according to a fourth embodiment of the present invention.

FIG. 18 is a diagram showing an example of the configuration of a pixel according to a fourth embodiment of the present invention.

The difference of the pixel PXLC in the fourth embodiment from the pixel PXLB in the third embodiment is as follows. In the pixel PXLC in the fourth embodiment, a CTIA feedback circuit 24 is configured as a so-called "T-switch system".

Specifically, the reset transistor RST-Tr is connected between the floating diffusion FD11 and the connection node ND21 of the other electrode of the feedback capacitor C11 and the feedback transistor FB-Tr. Further, between the connection node ND21 and a power supply VSET, a transistor SE-Tr is connected as a switch element which is selectively turned ON/OFF by the control signal SET<n>.

By configuring the CTIA feedback circuit 24 as a T-switch system in this way, the influence of capacitance coupling upon the FD node caused by a change of the vertical signal line can be reduced to a negligible level.

Fifth Embodiment

Figure 19:
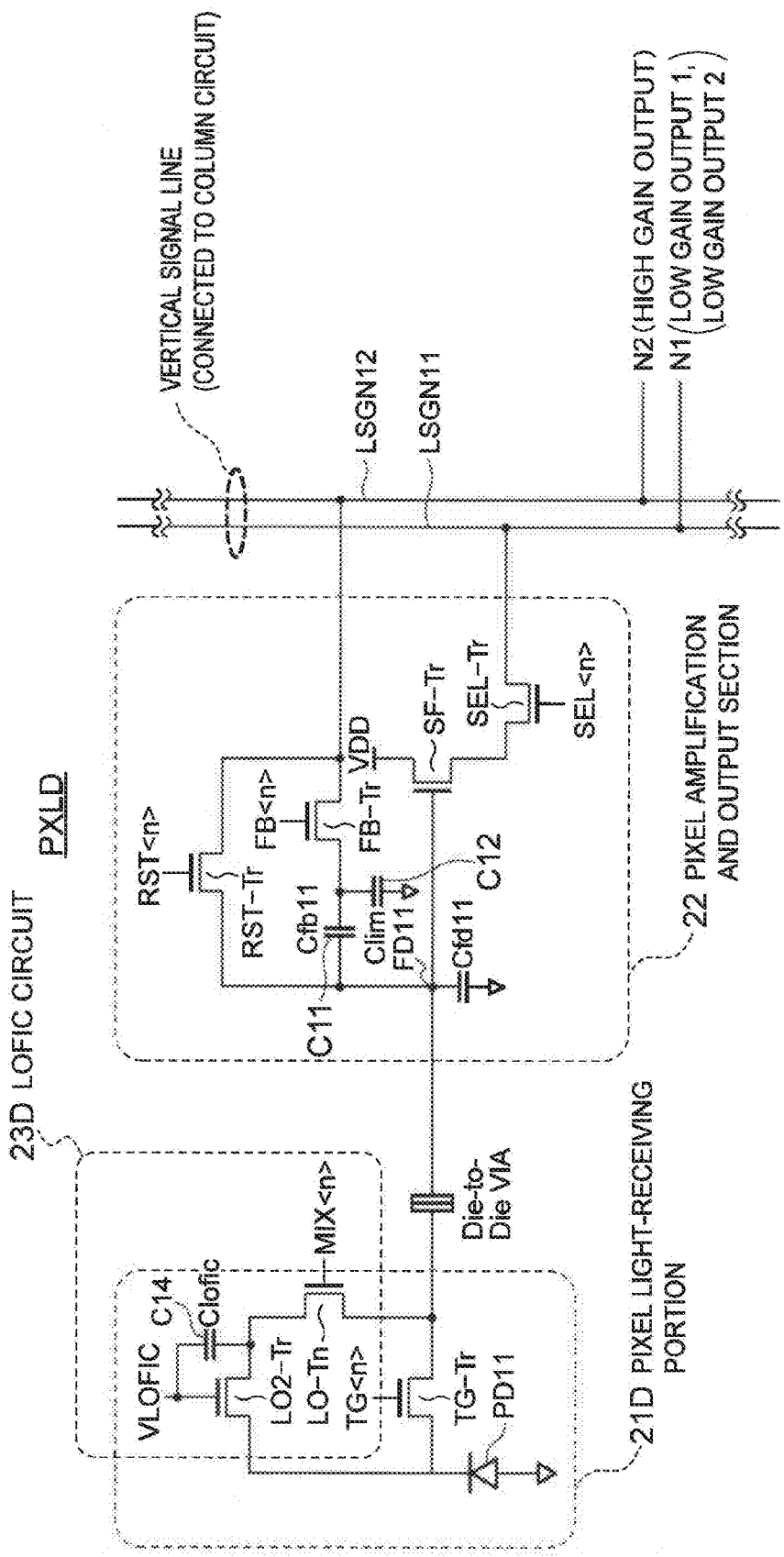
FIG. 19 is a diagram showing an example of the configuration of a pixel according to a fifth embodiment of the present invention.

FIG. 19 is a diagram showing an example of the configuration of a pixel according to a fifth embodiment of the present invention.

The difference of the pixel PXLD in the fifth embodiment from the pixel PXLB in the third embodiment is as follows. In the pixel PXLD in the fifth embodiment, in place of the node of the floating diffusion FD11, a LOFIC circuit 23D configured by a LOFIC capacitor C14 (capacitance (Clofic)) and transistors LO-Tr and LO2-Tr is connected to the pixel light-receiving portion 21D.

By adding the LOFIC circuit 23D capable of setting a middle gain to the pixel light-receiving portion 21D in this way, three different gains (high gain, middle gain, and low gain) can be provided. Due to this, the dynamic range can be further increased. Further, by rendering the transistor LO-Tr the ON state all the time, it is also possible to make this pixel operate as a pixel provided with two different gains (high gain and low gain).

Sixth Embodiment

Figure 20:
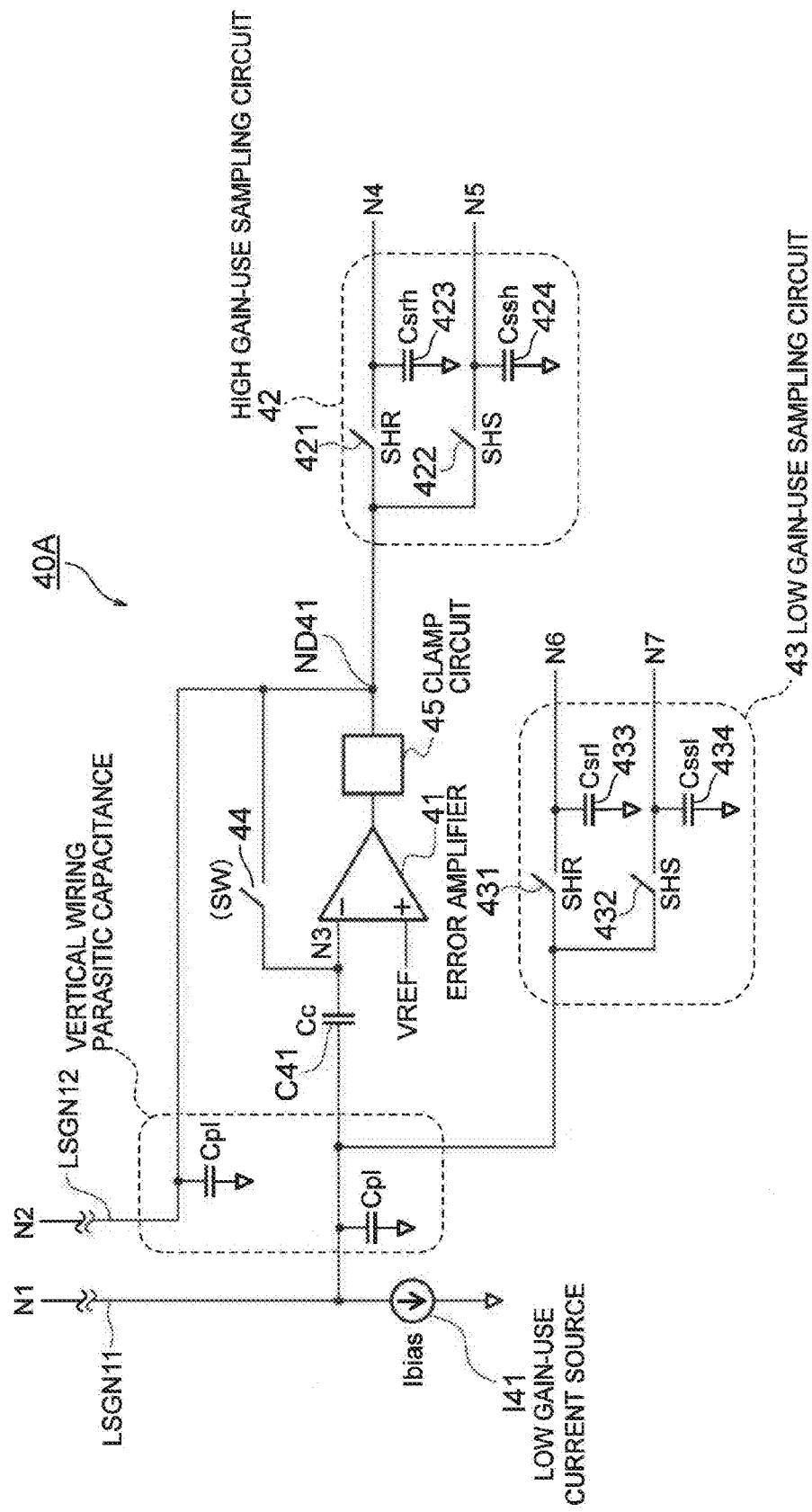
FIG. 20 is a circuit diagram showing an example of the configuration of a column readout circuit according to a sixth embodiment of the present invention.

FIG. 20 is a diagram showing an example of the configuration of a column readout circuit according to a sixth embodiment of the present invention.

The difference of a column readout circuit 40A in the sixth embodiment from the column readout circuits 40 in the first to fifth embodiments is as follows. In the column readout circuit 40A in the sixth embodiment, a clamp circuit 45 is connected to the output side of the error amplifier 41.

According to the sixth embodiment, not only the same effects as those by the first to fifth embodiments explained above, but also the following effects can be obtained. That is, according to the sixth embodiment, nonlinearity at the boundary between the high gain and the low gain can be reduced, therefore images of two gains can be combined with a high precision. Further, the upper limit of the high gain voltage range can be freely set, therefore versatility of the circuit rises.

Seventh Embodiment

Figure 21:
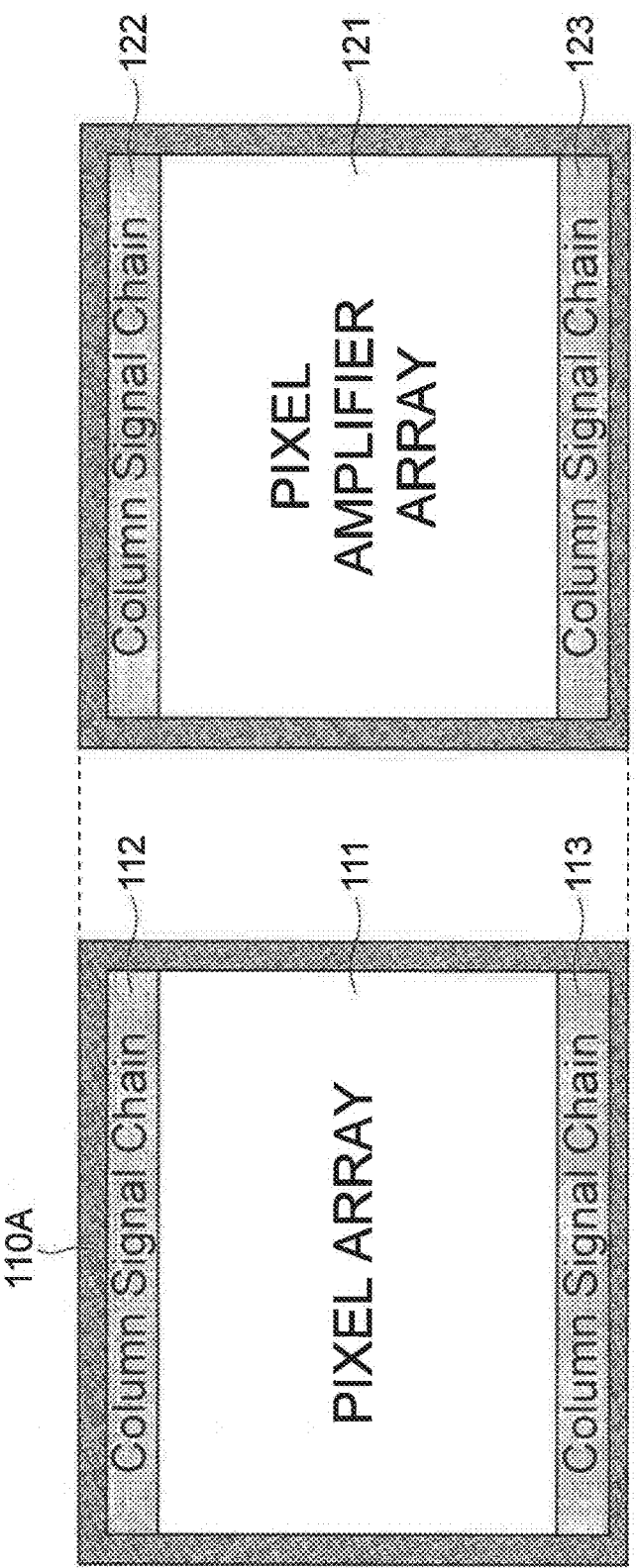
FIG. 21 is a diagram for explaining a stacked structure of a solid-state imaging device according to a seventh embodiment of the present invention.

FIG. 21 is a diagram for explaining a stacked structure of a solid-state imaging device according to a seventh embodiment of the present invention.

The difference of the stacked structure of the seventh embodiment from the stacked structures in the first to sixth embodiments is as follows. In the stacked structure in the present seventh embodiment, one more set of column readout circuit-use regions 112 and 113 is formed on the first substrate 110 side, and one more set of column readout circuits is formed on the first substrate 110 side.

Due to this, the readout speed is improved two-fold. Further, it is possible to mount only the capacitor necessary in the column readout circuit on the second substrate 120 side on the first substrate 110 side. Due to this, the column length of the entire column readout circuit is shortened, the area ratio of the pixel array portion and the column readout circuit on the chip surface is improved, therefore the stacked chip is helped to be made smaller in size.

The solid-state imaging device 10 explained above can be applied as an imaging apparatus to a digital camera, video camera, portable terminal or monitoring camera, medical endoscope, or other electronic apparatus.

Figure 22:
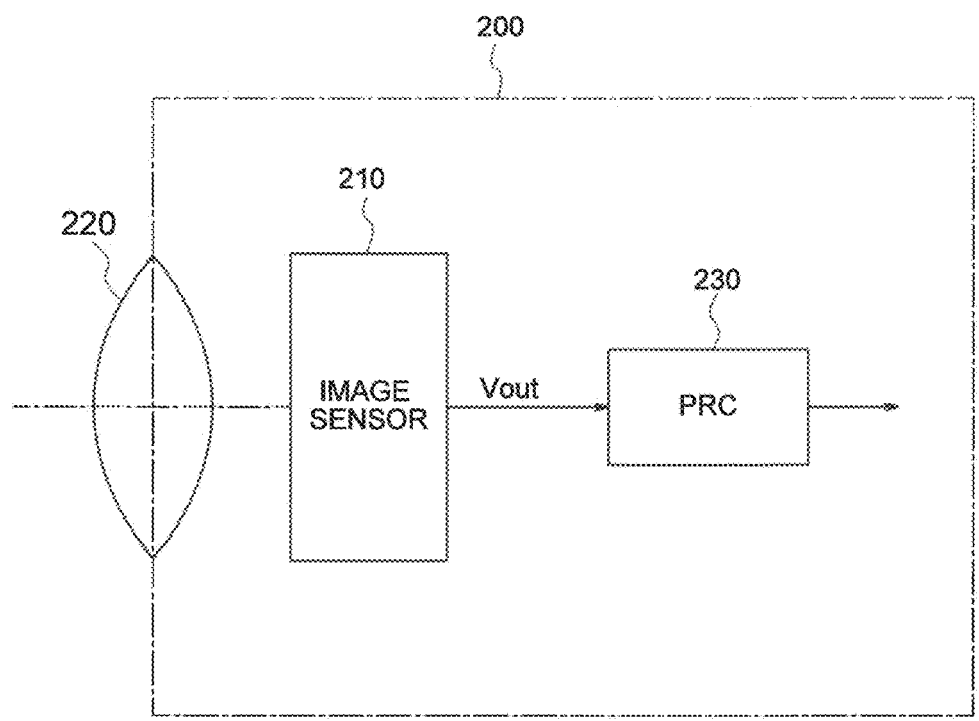
FIG. 22 is a diagram showing an example of the configuration of an electronic apparatus to which a solid-state imaging device according to an embodiment of the present invention is applied.

FIG. 22 is a diagram showing an example of the configuration of an electronic apparatus mounting a camera system to which the solid-state imaging device according to an embodiment of the present invention is applied.

The electronic apparatus 200, as shown in FIG. 22, has a CMOS image sensor 210 to which the solid-state imaging device 10 according to the present embodiment can be applied. Further, the electronic apparatus 200 has an optical system (lens etc.) which guides incident light (forms a subject image) into the pixel region of this CMOS image sensor 210. The electronic apparatus 200 has a signal processing circuit (PRC) 230 for processing the output signal of the CMOS image sensor 210.

The signal processing circuit 230 applies predetermined signal processing with respect to the output signal of the CMOS image sensor 210. The image signal processed in the signal processing circuit 230 is projected as a moving picture on a monitor configured by a liquid crystal display etc. or can be output to a printer as well. Further, various embodiments are possible. For example, it is directly recorded on a memory card or another recording medium.

As explained above, by mounting the solid-state imaging device 10 explained before as the CMOS image sensor 210, it becomes possible to provide a high performance, small-size, and low cost camera system. Further, for example, a monitoring camera, medical endoscope-use camera, or other electronic apparatus which is used in applications restricted in factors of camera installation such as mount size, number of connectable cables, cable length, installation height, or the like can be realized.

The invention claimed is:

1. A solid-state imaging device comprising
a pixel portion in which pixels are arranged,
a readout circuit including an amplifier capable of amplifying a pixel readout voltage read out from the pixels,
a first signal line to which a readout voltage of a low gain is output, and
a second signal line to which the output side of the amplifier is connected and a readout voltage of a high gain is output, wherein
a pixel includes
a photoelectric conversion element which accumulates a charge generated by photoelectric conversion in an accumulation period,
a transfer element capable of transferring a charge accumulated in the photoelectric conversion element in a transfer period,
a floating diffusion to which a charge accumulated in the photoelectric conversion element is transferred through the transfer element,
a source-follower element which converts the charge of the floating diffusion to a voltage signal in accordance with the charge quantity,
a reset element which resets the floating diffusion to a potential of the second signal line or a predetermined potential in a reset period, and
a feedback capacitor having one electrode connected to the floating diffusion and having another electrode connected to the second signal line, wherein
the first signal line connected to an output line of the voltage signal by the source-follower element and connected to the input side of the amplifier.

2. The solid-state imaging device according to claim 1, wherein a capacitance of the feedback capacitor is smaller than a capacitance of the floating diffusion.

3. The solid-state imaging device according to claim 2, wherein when the capacitance of the feedback capacitor is Cfb and the capacitance of the floating diffusion is Cfd,
the high gain is proportional to 1/Cfb, and the low gain is proportional to 1/Cfd.

4. The solid-state imaging device according to claim 1, wherein a pixel includes a feedback element which electrically connects the feedback capacitor with the second signal line in a feedback period.

5. The solid-state imaging device according to claim 1, wherein the pixel includes a selection element which electrically connects the output line of the voltage signal from the source-follower element with the first signal line.

6. The solid-state imaging device according to claim 1, wherein the readout circuit includes a serial capacitor connected to an input stage of the amplifier.

7. The solid-state imaging device according to claim 1, wherein the readout circuit includes a switch capable of selectively switching the input terminal and the output terminal of the amplifier to a connection state and disconnection state.

8. The solid-state imaging device according to claim 1, wherein the readout circuit includes
a low gain-use sampling circuit which is connected to the first signal line and can sample the readout voltage of a low gain read out to the first signal line and
a high gain-use sampling circuit which is connected to a connection node between the output terminal of the amplifier and the second signal line and can sample the readout voltage of a high gain read out to the second signal line.

9. The solid-state imaging device according to claim 1, wherein
the readout circuit includes
an error amplifier as the amplifier,
a serial capacitor
a switch capable of switching between a connection state and disconnection state,
a low gain-use sampling circuit which is connected to the first signal line and can sample the readout voltage of a low gain read out to the first signal line, and
a high gain-use sampling circuit which can sample the readout voltage of a high gain read out to the second signal line, and,
in the error amplifier,
the output terminal is connected to the second signal line and its connection node is connected to the high gain-use sampling circuit,
one input terminal is connected to the serial capacitor and is connected through the serial capacitor to the first signal line, the switch is connected between the one input terminal and the output terminal, and the other input terminal is connected to a supply line of a reference voltage.

10. The solid-state imaging device according to claim 9, wherein the switch is held in the connection state and holds the error amplifier in a unity gain buffer state in the reset period of the pixel and a predetermined period after release of reset.

11. The solid-state imaging device according to claim 10, wherein the switch is held in the disconnection state and releases the error amplifier from the unity gain buffer state after the predetermined period.

12. The solid-state imaging device according to claim 9, wherein it is possible to switch the reference voltage to change settings of the ranges of high gain and low gain.

13. The solid-state imaging device according to claim 9, wherein a clamp circuit is connected to the output side of the error amplifier.

14. The solid-state imaging device according to claim 9, wherein the reset element connects the floating diffusion to the second signal line and resets the same to the potential of the second signal line in the reset period.

15. The solid-state imaging device according to claim 1, having a stacked structure including
a first substrate and
a second substrate, wherein
the first substrate and the second substrate are connected through a connection portion,
on the first substrate,
at least the photoelectric conversion element and transfer element of each pixel are formed as a pixel light-receiving portion, and
on the second substrate,
at least the floating diffusion, source-follower element, reset element, and feedback capacitor of each pixel are formed as a pixel amplification and output section, and the first signal line, the second signal line, and at least a portion of the readout circuit including at least an amplifier are formed.

16. The solid-state imaging device according to claim 1, wherein a high luminance-use capacitor is connected to the floating diffusion.

17. The solid-state imaging device according to claim 1, wherein a circuit capable of selectively adding a predetermined capacitance is connected to the capacitance of the floating diffusion.

18. The solid-state imaging device according to claim 1, wherein:
each pixel has
a circuit capable of selectively adding a predetermined capacitance connected to the capacitance of the floating diffusion and includes
a feedback element for electrically connecting the feedback capacitor with the second signal line in the feedback period and
a switch element for selectively connecting the connection node of the feedback capacitor and the feedback element to a predetermined power supply, and
the reset element is connected between the floating diffusion and the connection node of the feedback capacitor and the feedback element.

19. A method for driving a solid-state imaging device having
a pixel portion in which pixels are arranged,
a readout circuit including an amplifier capable of amplifying a pixel readout voltage read out from the pixels, a first signal line to which a readout voltage of a low gain is output, and a second signal line to which the output side of the amplifier is connected and a readout voltage of a high gain is output, wherein a pixel includes a photoelectric conversion element which accumulates a charge generated by photoelectric conversion in an accumulation period, a transfer element capable of transferring a charge accumulated in the photoelectric conversion element in a transfer period, a floating diffusion to which a charge accumulated in the photoelectric conversion element is transferred through the transfer element, a source-follower element which converts the charge of the floating diffusion to a voltage signal in accordance with the charge quantity, a reset element which resets the floating diffusion to the potential of the second signal line or a predetermined potential in a reset period, and a feedback capacitor having one electrode connected to the floating diffusion and having another electrode connected to the second signal line, wherein the first signal line connected to an output line of the voltage signal by the source-follower element and connected to the input side of the amplifier, comprising the steps of, when the charge from the photoelectric conversion element is small, transferring all of the charge to the feedback capacitor by a mirror effect created by a capacitive trans-impedance amplifier (CTIA) circuit including the amplifier and a feedback capacitor and thereby obtaining an output voltage amplified with a high gain and moving remaining excessive charge to the floating diffusion having a larger capacity by automatic reduction of the mirror effect when the CTIA circuit is saturated and thereby obtaining an output voltage amplified with a low gain.

20. An electronic apparatus comprising
a solid-state imaging device and
an optical system for forming a subject image in the solid-state imaging device, wherein
the solid-state imaging device has
a pixel portion in which pixels are arranged,
a readout circuit including an amplifier capable of amplifying a pixel readout voltage read out from the pixels,
a first signal line to which a readout voltage of a low gain is output, and
a second signal line to which the output side of the amplifier is connected and a readout voltage of a high gain is output, wherein
a pixel includes
a photoelectric conversion element which accumulates a charge generated by photoelectric conversion in an accumulation period,
a transfer element capable of transferring a charge accumulated in the photoelectric conversion element in a transfer period,
a floating diffusion to which a charge accumulated in the photoelectric conversion element is transferred through the transfer element,
a source-follower element which converts the charge of the floating diffusion to a voltage signal in accordance with the charge quantity, a reset element which resets the floating diffusion to a potential of the second signal line or a predetermined potential in a reset period, and a feedback capacitor having one electrode connected to the floating diffusion and having another electrode connected to the second signal line, wherein the first signal line connected to an output line of the voltage signal by the source-follower element and connected to the input side of the amplifier.

* * * * *